US012343657B2

(12) United States Patent
Yan et al.

(10) Patent No.: US 12,343,657 B2
(45) Date of Patent: Jul. 1, 2025

(54) KINETIC SCULPTURE AND INTELLIGENT CONTROL SYSTEM

(71) Applicant: ZHEJIANG DAFENG INDUSTRY CO., LTD., Ningbo (CN)

(72) Inventors: Huafeng Yan, Ningbo (CN); Qingjun Liu, Ningbo (CN); Haihong Tian, Ningbo (CN); Xiaojun Wang, Ningbo (CN); Ting Wang, Ningbo (CN); Zhengping Wu, Ningbo (CN); Yueping Xu, Ningbo (CN); Huiwen Xu, Ningbo (CN); Zhen Liu, Ningbo (CN); Ruisheng Yan, Ningbo (CN); Linbo Chen, Ningbo (CN); Yinhui Zhou, Ningbo (CN); Bin Huang, Ningbo (CN); Zhujun Su, Ningbo (CN)

(73) Assignee: ZHEJIANG DAFENG INDUSTRY CO., LTD., Ningbo (CN)

( * ) Notice: Subject to any disclaimer, the term of this patent is extended or adjusted under 35 U.S.C. 154(b) by 639 days.

(21) Appl. No.: 17/758,223

(22) PCT Filed: Dec. 30, 2020

(86) PCT No.: PCT/CN2020/141252
§ 371 (c)(1),
(2) Date: Jun. 29, 2022

(87) PCT Pub. No.: WO2021/136346
PCT Pub. Date: Jul. 8, 2021

(65) Prior Publication Data

US 2023/0078559 A1 Mar. 16, 2023

(30) Foreign Application Priority Data

Dec. 31, 2019 (CN) ........................ 201911415809.X

(51) Int. Cl.
*A63J 1/02* (2006.01)
*B44C 3/06* (2006.01)

(52) U.S. Cl.
CPC .. *A63J 1/02* (2013.01); *B44C 3/06* (2013.01)

(58) Field of Classification Search
CPC ...... A63J 1/02; A63J 1/00; B44C 3/06; A63H 33/42
See application file for complete search history.

(56) References Cited

U.S. PATENT DOCUMENTS 5,741,140 A * 4/1998 Bristol ...................... B44C 3/06 446/374
6,228,443 B1 * 5/2001 Ditto ...................... A41G 1/007 427/206

(Continued)

FOREIGN PATENT DOCUMENTS

CN 111097181 A * 5/2020 ................ A63J 1/00
CN 111114178 A * 5/2020 ............... B44C 3/06

(Continued)

OTHER PUBLICATIONS

"Why Ali and Nino Statue is a moving love Sculpture" Lijinwen. Oct. 18, 2019 (Year: 2019).*

*Primary Examiner* — Magdalena Topolski
(74) *Attorney, Agent, or Firm* — Getech Law LLC; Jun Ye

(57) ABSTRACT

A kinetic sculpture and an intelligent control system are provided which comprise a plurality of movable bases (500), and the movable bases are arranged radially along a circumferential direction around a centerline disposed vertically; a bearing unit (400) is mounted on each of the movable bases (500), a vertical column (100) is mounted on the bearing unit (400), and a blade unit (200) is disposed on the column (100); the bearing units (400) move the columns (100) along the moving paths on the respective movable bases toward (Continued)

the position of the centerline or away from the position of the centerline to achieve combination or separation; the column systems correspondingly control each of the columns (100) to move. The kinetic sculpture enables the blades (201) of the kinetic sculpture to present a contour shape in gathered and separated states.

35 Claims, 29 Drawing Sheets

(56) References Cited

U.S. PATENT DOCUMENTS

| | | | | |
|---|---|---|---|---|
| 10,718,495 | B2 * | 7/2020 | Muntean | F21V 11/183 |
| 12,029,998 | B2 * | 7/2024 | Eck | A63J 19/006 |
| 2022/0375372 | A1 * | 11/2022 | Feng | F16H 37/04 |

FOREIGN PATENT DOCUMENTS

| | | | | | |
|---|---|---|---|---|---|
| CN | 111186241 | A | * | 5/2020 | B44C 3/06 |
| CN | 111186242 | A | * | 5/2020 | B44C 3/06 |
| CN | 111186243 | A | * | 5/2020 | B44C 3/06 |
| CN | 111219468 | A | * | 6/2020 | B44C 3/06 |
| CN | 111231560 | A | * | 6/2020 | B44C 3/06 |
| CN | 112169358 | A1 | * | 1/2021 | |
| CN | 218054700 | U | * | 12/2022 | |
| CN | 221737521 | U | * | 9/2024 | |
| GB | 580425 | A | * | 9/1946 | |

* cited by examiner

A

E

KINETIC SCULPTURE AND INTELLIGENT CONTROL SYSTEM

TECHNICAL FIELD

The present invention relates to the field of stage machinery technologies, and in particular to a kinetic sculpture and an intelligent control system.

BACKGROUND

A kinetic sculpture is an important part of urban humanistic building. There are already some movable kinetic sculptures among the existing three-dimensional sculptures. The existing three-dimensional sculpture can move along a predetermined trajectory under the drive of a drive component, thereby improving a display effect of the three-dimensional sculpture. However, the existing kinetic sculpture can only complete simple translation and combination actions, and can provide visual sculpture display to the audience only when the three-dimensional sculpture is in a combined state. When the three-dimensional sculpture is in a separated state, each component of the movable three-dimensional sculpture is in disorder and thus cannot provide visual appreciation to people. Therefore, the existing movable three-dimensional sculptures generally have the problems of moving with simple actions and presenting a sculpture contour only in a combined state, thereby bringing poor display effect.

SUMMARY

To solve one of the technical problems in the prior art at least to some extent, the present invention provides a kinetic sculpture which can enable the blades of the kinetic sculpture to present a contour shape in gathered and separated states.

In view of this, one object of the present invention is to provide a kinetic sculpture, comprising a plurality of movable bases arranged radially along a circumferential direction around a centerline disposed vertically. A bearing unit is mounted on each of the movable bases, a vertical column is mounted on the bearing unit, and a blade unit is disposed on the column. The bearing units move the columns along moving paths on the respective movable bases toward the position of the centerline or away from the position of the centerline to achieve combination or separation.

Preferably, the movable base comprises a track and a base drive assembly. A translation assembly is slidably mated on the track, a rotary assembly is mounted on the translation assembly, and the bearing unit is mounted on the rotary assembly. The translation assembly can be driven by a drive device to move back and forth on the track.

Preferably, the translation assembly comprises a slide seat slidably mated on the track. A first roller assembly is disposed on the slide seat, and a first roller of the first roller assembly is rollably mated on a side wall of the track. When the slide seat slides along the track, the first roller rolls on the side wall of the track.

Preferably, the rotary assembly comprises a turntable, a fixing shaft and a first driver. The fixing shaft is fixed on the slide seat, the turntable is axially limited and may be circumferentially rotatably mounted on the fixing shaft, and the first driver drives the turntable to rotate. The bearing unit is fixed on the turntable.

Preferably, the first driver is a motor, an output end of the motor is provided with a gear, a peripheral wall of the turntable is provided with a gear ring, and the gear and the gear ring are mutually engaged.

Preferably, a locking mechanism is disposed between the bearing unit and the slide seat. The locking mechanism comprises a lock body and a locking buckle. The locking buckle is mounted on the bearing unit and the locking body is mounted on the slide seat. The locking body is further provided with a locking tongue and a second driver, and the second driver drives the locking tongue to be inserted into the locking buckle for locking or exited from the locking buckle for unlocking.

Preferably, the base drive assembly comprises a rack and a third driver. An output end of the third driver is connected with a gear, the rack is mounted on the slide seat, and the gear and the rack are mutually engaged.

Preferably, the blade unit of the column comprises a plurality of blade groups disposed in a spacing along an axial direction of the column. The blade group comprises one or more movable blades, and a blade drive unit for driving the movable blades in a same blade group to freely switch between a gathered state and a separated state is disposed on the column.

Preferably, the blade drive unit comprises an axial movement mechanism for driving the movable blades to move along the axial direction of the column and a circumferential movement mechanism for driving the movable blades to rotate along a circumferential direction of the column.

Preferably, the axial movement mechanism comprises a traction chain pulling along the axial direction of the column, and the movable blade is connected on the corresponding traction chain.

Preferably, the movable blade comprises a blade body and a support ring, the blade body is rotatably cooperated with the support ring under the drive of the circumferential movement mechanism, and the support ring is connected with the traction chain.

Preferably, the support ring is an annular structure, a mounting through-hole is disposed on the movable blade, an annular slide groove is disposed in the mounting through-hole, the support ring is slidably cooperated with the slide groove along a circumferential direction of the mounting through-hole, and the movable blade and the support ring are sleeved around the column.

Preferably, the circumferential movement mechanism is a blade motor fixed on the blade body of the movable blade, and the movable blade is rotated relative to the support ring under a drive force of the blade motor.

Preferably, the blade motor is disposed inside the blade body of the movable blade.

Preferably, the blade group comprises a reference blade connected with the column, and all movable blades in a same blade group are driven by the axial movement mechanism to move toward the reference blade to be in a gathered state or restore to be in a separated state in a direction away from the reference blade.

Preferably, the reference blade comprises a blade body and a support ring, the support ring of the reference blade is fixedly connected with the column, and the blade body of the reference blade rotatably cooperates with the support ring of the reference blade.

Preferably, a blade motor is disposed in the blade body of the reference blade to drive the blade body of the reference blade to rotate relative to the support ring of the reference blade.

Preferably, there are four movable blades in the blade group, and the four movable blades are symmetrically disposed about a horizontal plane of the reference blade.

Preferably, a reference plane perpendicular to an axis of the column is disposed in the blade group, and all movable blades in the blade group are driven by the axial movement mechanism to move toward the reference plane in the blade group to be in a gathered state or restore to be in a separated state in a direction away from the reference plane.

Preferably, there are four movable blades in the blade group, and the four movable blades are symmetrically disposed about a horizontal plane of the reference plane.

Preferably, the axis of the column is a curve zigzagging along a vertical direction.

Preferably, a blade mounting region is vertically disposed on the column, the blade unit is located in the blade mounting region, the traction chain is vertically penetrated through the blade mounting region, a portion of the traction chain located in the blade mounting region comprises at least one functional section formed by connecting a roller unit with a length-adjustable telescoping unit, and a guide rail cooperating with the roller unit is axially laid on the column.

Preferably, there are an even number of traction chains, and an annular traction chain is formed by connecting two ends of any two adjacent traction chains located outside the blade mounting region.

Preferably, when the traction chain is an annular structure, a portion of the traction chain located above the blade mounting region is wound on a fixed pulley at the top of the column, and a portion of the traction chain located below the blade mounting region extends onto the bearing unit and connects with a traction chain drive device on the bearing unit.

Preferably, six annular traction chains are disposed on the column and uniformly distributed along the circumferential direction of the column so as to form 12 functional sections in the blade mounting region, and a fixed pulley is disposed at a position that is at the top of the column and corresponds to each traction chain.

Preferably, any telescoping unit and an adjacent roller unit are rotatably connected by a universal joint.

Preferably, the telescoping unit comprises an upper adjusting rod, a lower adjusting rod and an adjusting sleeve. The upper adjusting rod and the lower adjusting rod are spaced apart along a same axis and opposed ends of the upper adjusting rod and the lower adjusting rod are inserted into both ends of the adjusting sleeve respectively. The upper adjusting rod and the lower adjusting rod are both thread-connected with the adjusting sleeve, and the upper adjusting rod and the lower adjusting rod can move close to each other or away from each other along with the rotation of the adjusting sleeve.

Preferably, the roller unit comprises a roller body, and a slide groove cooperating with the guide rail is disposed at a position that is on the roller body and corresponds to the guide rail.

Preferably, the universal joint comprises a male connector, a female connector, a rotary core block and a rotary shaft. One end of the male connector is fixedly connected with the telescoping unit, and the other end of the male connector is hinged with the rotary core block along a first rotational plane. One end of the female connector is rotatably mated with the roller body along a circumferential direction of an axis of the roller body, the other end of the female connector is hinged with the rotary core block along a second rotational plane, and the two rotational planes are perpendicular to each other.

Preferably, a guide wheel slidably cooperating with the guide rail is disposed on the roller body, the guide wheel is rotatably mated with the roller body around its own axis, and a slide groove is formed at an outer circumferential surface of the guide wheel.

Preferably, the guide wheel comprises a first guide wheel and a second guide wheel which are spaced apart along an axial direction of the roller body, and a connection region for mounting the movable blade is reserved between the first guide wheel and the second guide wheel.

Preferably, the movable blade comprises a support ring and a blade body. The blade body of the movable blade rotatably cooperates with the support ring of the movable blade, and part or all of the support ring is connected with the connection region of the roller body.

Preferably, there are a plurality of first guide wheels and a plurality of second guide wheels, and the outer circumferential surfaces of any two adjacent first guide wheels and the outer circumferential surfaces of the corresponding two second guide wheels are enclosed together to form a slide groove matched with the guide rail.

Preferably, the guide rail comprises two guide rods paralleled to each other, and both ends of the guide rod extend along the axial direction of the column.

Preferably, there are a plurality of roller units and a plurality of telescoping units on each functional section of each traction chain, and all roller units and all telescoping units on each functional section are arranged in sequence and connected with each other.

Preferably, all roller units and all telescoping units on each functional section are disposed sequentially and alternately.

Preferably, three connection points are disposed in a circumferential direction of the support ring of the movable blade. Traction chains are disposed at positions that are on the column and correspond to the three connection points respectively, and the three connection points on the support ring and their respective corresponding traction chains are connected using one reference connection piece and two length-adjustable connection pieces respectively. The three traction chains are synchronously linked to enable the movable blade to ascend and descend along the axial direction of the column.

Preferably, the reference connection piece comprises a reference connection screw rod, one end of the reference connection screw rod is fixedly connected with the corresponding traction chain, and the other end of the reference connection screw rod is connected with the support ring by a universal joint.

Preferably, the reference connection piece comprises two first leveling springs symmetrically disposed at both sides of the reference connection screw rod, and both ends of the first leveling spring are connected with the support ring and the traction chain where the reference connection screw rod is located respectively.

Preferably, the adjustable connection piece comprises an adjustable pull rod with an adjustable length. A lower end of the adjustable pull rod is rotatably connected with the support ring by a universal joint, and an upper end of the adjustable pull rod is located above the movable blade and rotatably connected with the corresponding traction chain by another universal joint.

Preferably, the bearing unit comprises a bearing seat. The column is vertically disposed on the bearing seat. The traction chain is an annular structure, an upper portion of the traction chain is wound on a fixed pulley at the top of the column, and a lower portion of the traction chain extends onto the bearing unit and connects with a traction chain drive device on the bearing unit.

Preferably, the traction chain drive device comprises a drive box located under the column. At least two drive assemblies are disposed in the drive box along the axial direction of the column. Each of the drive assemblies comprises a drive shaft and a driven member in transmission connection with the drive shaft. The driven member is in transmission connection with the traction chain.

Preferably, a projection position of each drive shaft along the axial direction of the column and a projection position of the adjacent drive shaft along the axial direction of the column are staggered.

Preferably, a projection position of the driven member along the axial direction of the column is set along the circumferential direction of the column.

Preferably, the driven members in the drive assembly are uniformly disposed along the circumferential direction of the column.

Another object of the present invention is to provide an intelligent control system for a kinetic sculpture, comprising the structure of the above kinetic sculpture. The intelligent control system further comprises the following steps.

At step Z1, each column is correspondingly provided with one column system; the column system of each column runs back and forth at a preset speed for one cycle and turns on a corresponding lighting system; in the running cycle, a difference between a real time running speed of the column system and the predetermined speed is detected and a minimum value of the differences is selected and set to r1, and the column system is set as a target column; when the absolute value of r1 is greater than a preset value, Z2 is performed.

At step Z2, a real time position of the target column is obtained; when the real time position of the target column is greater than a preset position, Z3 is performed; when the real time position of the target column is less than or equal to the preset position, Z4 is performed.

At step Z3, the preset speeds of the column systems other than the target column are corrected based on the real time running speed of the target column to maintain consistency and S1 is performed.

At step Z4, the target column stops and records a running time t1 before stop, and turns off the lighting system corresponding to the column system, and also records, in real time, a real-time remaining time t2 in the cycle except for the target column system; when the remaining time t2 is less than or equal to the running time t1, Z5 is performed.

At step Z5, the target column directly runs reversely at the preset speed and turns on the lighting system corresponding to the column system, and other column systems run at the preset speed or at a corrected speed; after the cycle is reached, each column system stops running.

The additional aspects and advantages of the present invention will be given below in the following descriptions and part of them will become apparent from the following descriptions or known through practice of the present invention.

The above technical solutions have the following advantages or beneficial effects: firstly, the column on the bearing unit can be provided with a plurality of blade groups, and the bearing unit can move the blade groups on the column to combine with the blade groups on an adjacent column to form a kinetic sculpture. Further, the blade drive unit on the column can enable each blade group on the column to move such that multiple contour shapes can be displayed when the blade groups on the column switch between a gathered state and a separated state, making the shapes of the entire kinetic sculpture diversified. Further, by using the column system, various columns can be coordinated to run synchronously and any running fault occurring to an individual column can be corrected automatically to ensure a display effect of the sculpture and realize intelligent control. Moreover, in a case of failure of an individual column, the column system can autonomously intervene to perform control to effectively avoid mutual interference of devices and achieve automatic safety control of the entire equipment.

BRIEF DESCRIPTIONS OF THE DRAWINGS

NUMERALS OF THE DRAWINGS ARE DESCRIBED BELOW

- 100: column;
- 200: blade unit;
- 201: blade, 2011: blade body, 2012: support ring, 201-0: reference blade, 201-S: movable blade, 201-S1: upper first movable blade, 201-S2: upper second movable blade, 201-S3: lower first movable blade, 201-S4: lower second movable blade;
- 300: blade drive unit;
- 301: blade motor, 302: axial movement mechanism, 3021: traction chain, 3021-1: roller body, 3021-2: guide wheel, 3021-2': first guide wheel, 3021-2": second guide wheel, 3021-3: connection region, 3021-4: upper adjusting rod, 3021-5: lower adjusting rod, 3021-6: adjusting sleeve, 3021-7: male connector, 3021-8: female connector, 3022: reference connection piece, 3022-1: reference connection screw rod, 3022-2: first leveling spring, 3023: adjustable connection piece, 3023-1: adjustable pull rod, 3023-2: second leveling spring, 3023-3: embracing hoop, 3023-4: mounting sheet, 3024: reference support rod, 3025: adjustable support rod, 3026: lower connection sheet, 3027: upper connection sheet, 3028: lock nut, 3029: butterfly spring, 3030: chain, 303: guide rail, 3031: guide rod, 3032: abutting block, 304: fixed pulley, and 305: blade mounting region;
- 400: bearing unit;
- 401: drive box, 402: traction chain drive assembly, 4021: drive shaft, 4022: driven member, 4022-1: first driven member, 4022-2: second driven member, 403: driving bevel gear, 404: driven bevel gear, 405: traction chain power assembly, 4051: slide block, 4052: hydraulic component, 4054: transmission sprocket wheel, and 406: bearing seat.
- 500: movable base;
- 501: track, 5011: slide rail portion, 5011-1: slide rail bar, 5011-2: track connection piece, 5011-3: slide plate, 5011-4: limiting block, 5012: support portion, 502: slide seat, 503: limiting piece, 504: slide groove, 505: first fixing plate, 506: first rotary shaft, 507: first roller, 508: turntable, 509: bearing ring, 510: first driver, 511: gear ring, 512: fixing hole, 513: locking body, 514: locking buckle, 515: first rolling wheel, 516: first support plate, 517: second driver, 518: support frame, 519: second rolling wheel, 520: second support plate, 521: gear split body, 522: extension support, 523: third driver, 524: second fixing plate, 525: second rotary shaft, 526: second roller, 527: locking tongue.

DETAILED DESCRIPTIONS OF EMBODIMENTS

Embodiments of the present invention will be described in detail below with examples illustrated in the accompanying drawings, in which like or similar numerals represent like or similar elements or elements with like or similar functions throughout. The embodiments described below with reference to the accompanying drawings are exemplary and explanatory to explain the present invention, and are not intended to limit the present invention.

A movable three-dimensional sculpture according to an embodiment of the present invention will be described in detail below with reference to the accompanying drawings.

Figure 1:
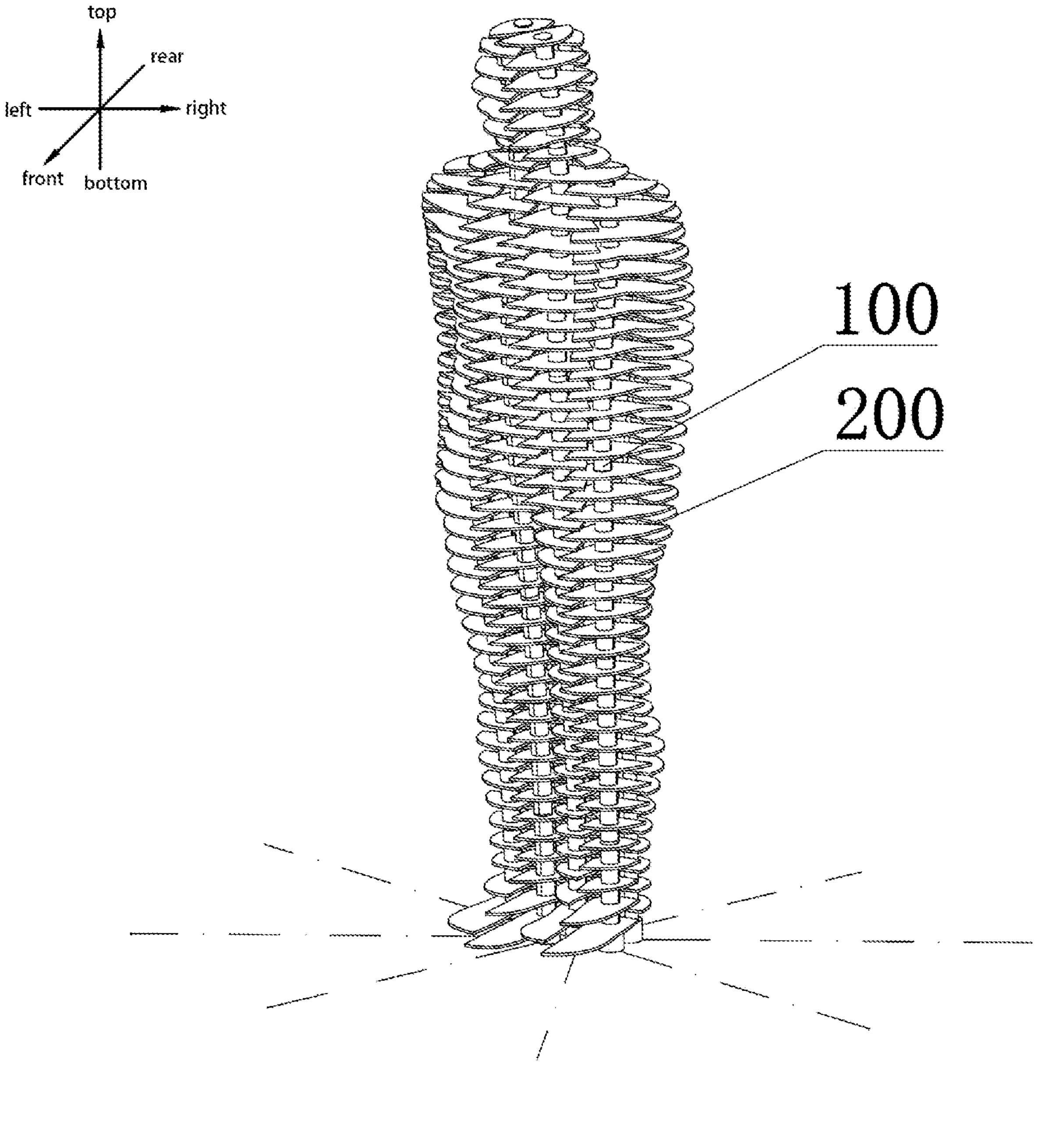
FIG. 1 is a structural schematic diagram illustrating a three-dimensional sculpture presented by gathering columns according to the present invention.
Figure 2:
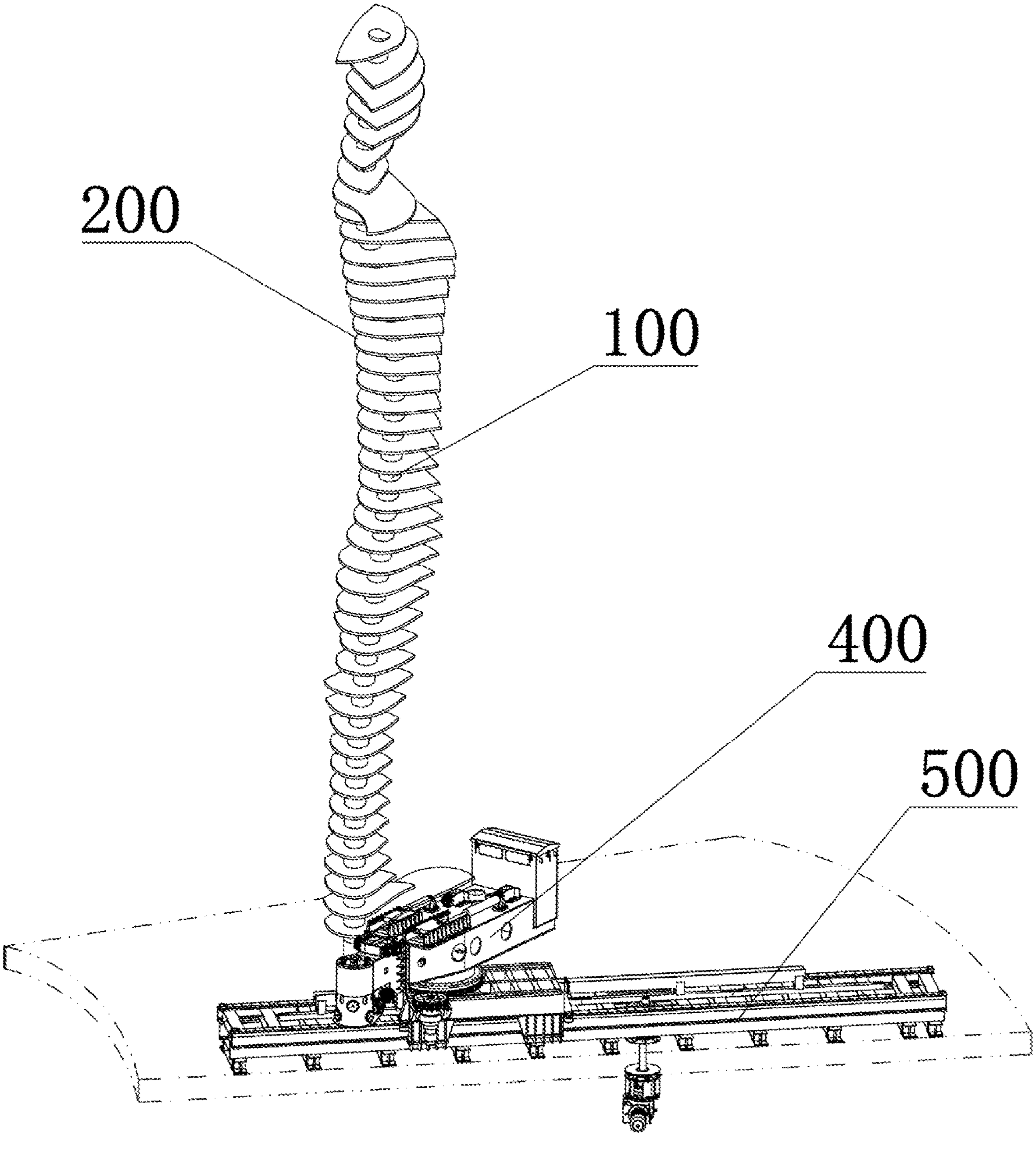
FIG. 2 is a structural schematic diagram illustrating a single column and blades on the single column in FIG. 1.
Figure 13:
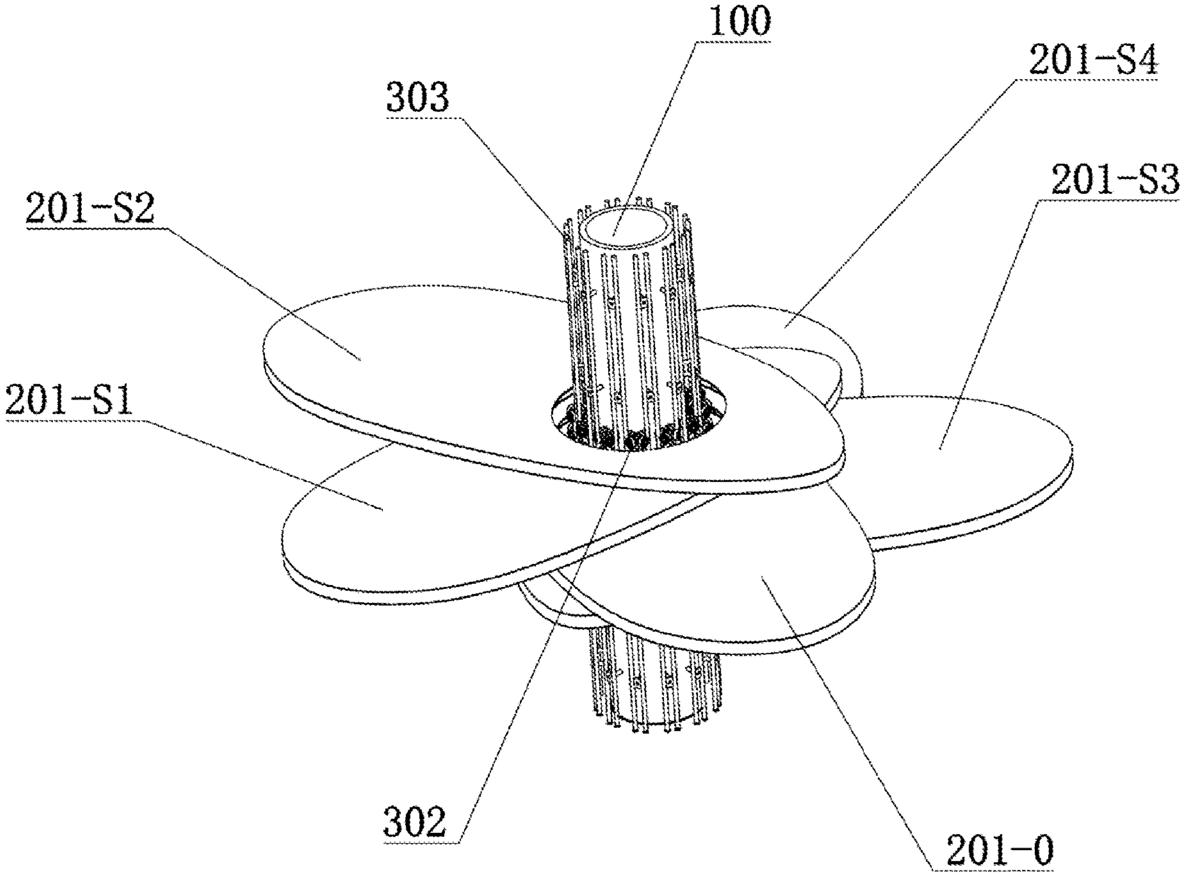
FIG. 13 is a structural schematic diagram illustrating a gathered state of a blade unit in FIG. 3.

The present invention provides a three-dimensional sculpture. The three-dimensional sculpture includes several vertically-placed columns 100 as shown in FIG. 1. Each column 100 is vertically located on its respective bearing unit 400 as shown in FIG. 2 and provided with a blade unit 200. Each blade unit includes several blade groups spaced apart along an axial direction of the column, and a blade drive unit 300 for driving each blade group in the blade unit 200 is disposed on the column 100. Specifically, a lower end of the column 100 is mounted on the bearing unit 400, and the column 100 can be moved along a horizontal direction under the drive of the bearing unit 400, such that the blade units on different columns 100 cooperate with each other to form an overall outer contour of the sculpture when the different columns 100 are gathered together, thereby bringing a visual effect of a whole sculpture shape to the audience. Certainly, the blade units on different columns 100 should be capable of cooperating with each other in order to jointly construct the outer contour of the whole kinetic sculpture. At this time, all blades in each blade group on the column 100 are arranged in a spacing to present a separated state, thereby helping adjacent blades on an adjacent column 100 to be overlapped. When different columns 100 are restored to be away from each other, the blades in each blade group in the blade unit 200 are gathered under the drive of respective blade drive unit 300 to form a separate pattern, for example, a flower pattern as shown in FIG. 13, which brings another shape of the sculpture to the audience. Obviously, each column 100 is an independent displaying unit at this time, and the blades in each blade group on each column 100 are gathered together, which is thus referred to as a gathered state. In this way, a three-dimensional sculpture with single shape can finally present at least two shapes. All blade units 200 on the column 100 as described above may be collectively referred to as movable components on the three-dimensional sculpture.

Embodiment 1

Figure 3:
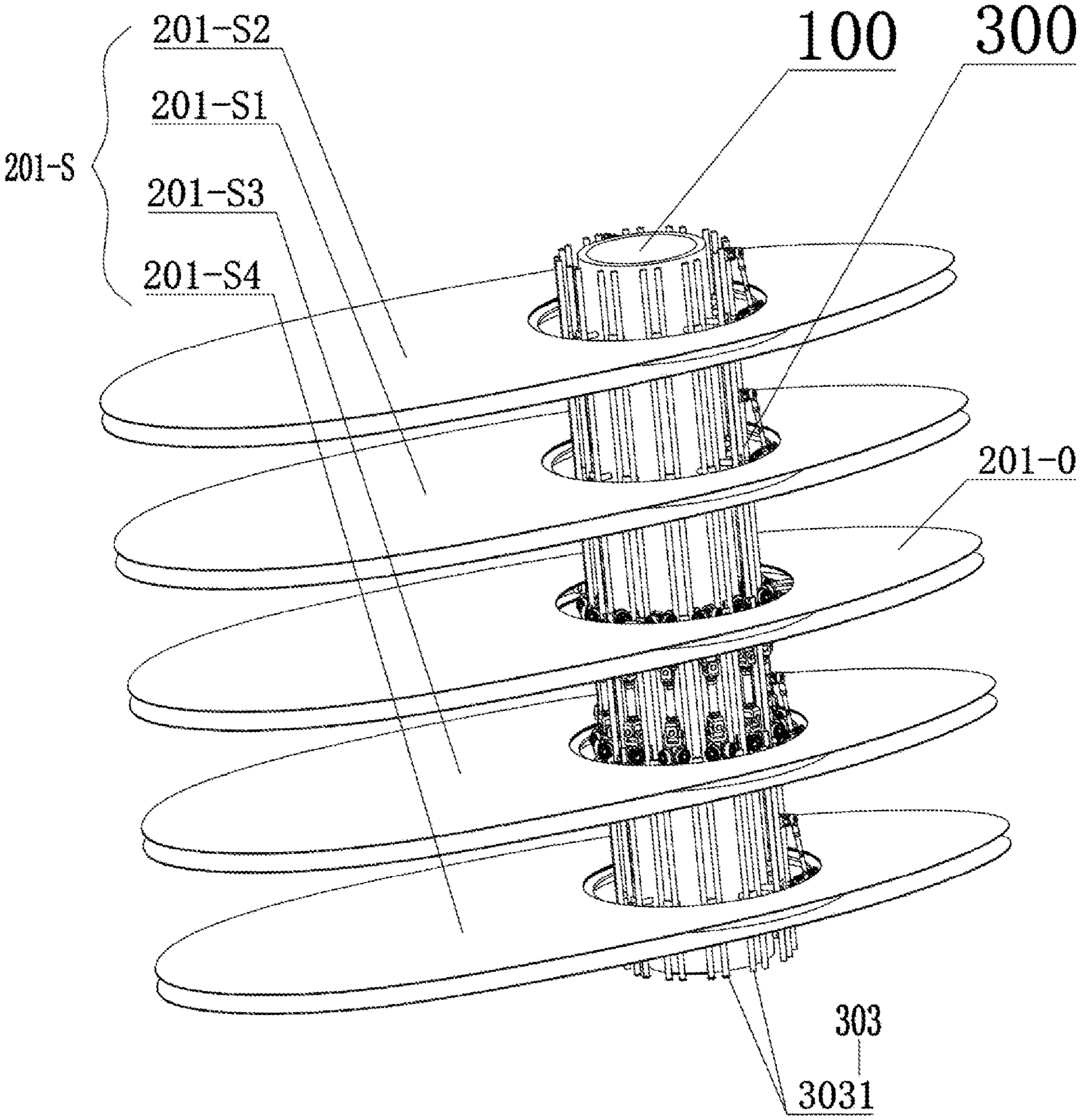
FIG. 3 is a structural schematic diagram illustrating one blade unit in a separated state on a column according to the present invention.

As shown in FIG. 3, the blade unit 200 in the above three-dimensional sculpture comprises a plurality of blade groups, and each blade group also comprises one or more blades 201. All blades 201 are sleeved around the column 100, and different blades 201 are sequentially disposed in a spacing along a length direction of the column 100. At least one or all of the above all blades 201 comprise a blade body 2011 and a support ring 2012 for supporting the blade body 2011. The support ring 2012 is sleeved around the column 100 and connected with the column 100. The blade body

2011 is mounted on the support ring 2012, and the blade body 2011 and the support ring 2012 are limited along an axial direction of the column 100 and rotatably cooperated along a circumferential direction of the column 100. A blade motor 301 for driving the blade body 2011 to rotate relative to the support ring 2012 is disposed on the blade body 2011, that is, the blade motor 301 in the blade drive unit 300 drives the blade body 2011 to rotate. Certainly, a conventional drive component such as a hydraulic motor may also be used to drive the blade body 2011 to rotate. Based on this, the movement process of the above support ring 2012 is described below with the conventional blade motor 301 as an example.

To form the outer contour of the three-dimensional sculpture, outer edges of different blade bodies 2011 arranged sequentially need to form a preset outer contour pattern of the three-dimensional sculpture. Therefore, the outer contours of different blade bodies 2011 along a horizontal direction on the same column 100 are all adjusted based on design requirements of the contour shape. But it is allowed to adopt a same or different connection mechanism for cooperating each blade body 2011 with the corresponding support ring 2012.

Specifically, the blade body 2011 is formed by an upper blade plate and a lower blade plate which are spaced apart and fixedly connected with each other. A mounting through-hole is formed by sequentially penetrating through the upper blade plate and the lower blade plate of the blade body 2011 along a thickness direction of the blade body 2011, and a size of the mounting through-hole is matched with the support ring 2012. The support ring 2012 is limited between the upper blade plate and the lower blade plate along the thickness direction of the blade body 2011, and the support ring 2012 rotatably cooperates with the blade body 2011 through a bearing.

Figure 11:
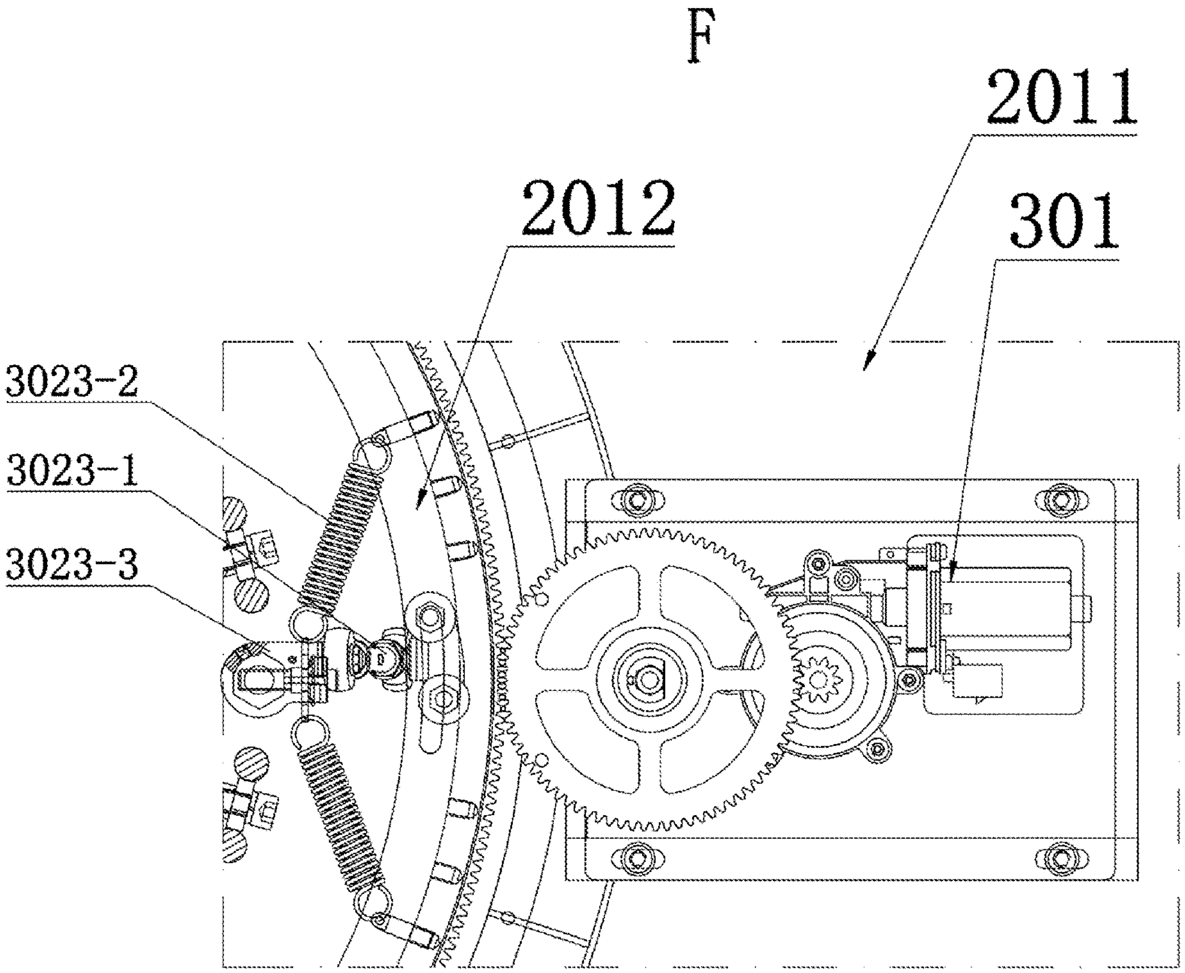
FIG. 11 is a partially-enlarged view of a region "F" in FIG. 10.
Figure 12:
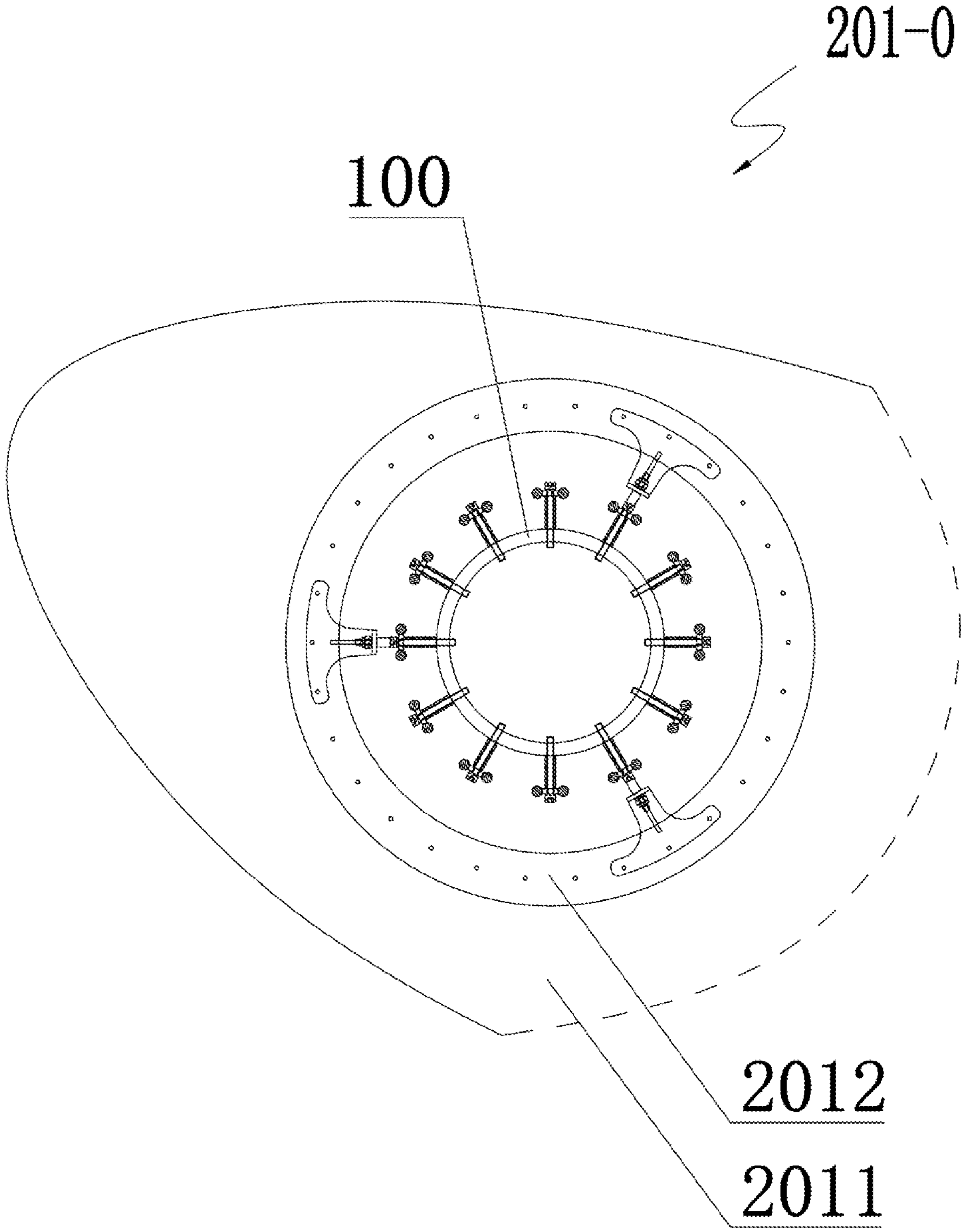
FIG. 12 is a schematic diagram illustrating a partial internal structure of a reference blade according to the present invention.

Preferably, as shown in FIG. 11, the blade motor 301 is disposed between the upper blade plate and the lower blade plate of the blade body 2011 to realize the built-in designing of the blade motor 301, thus at least achieving protection against wind and rain. One of the above examples in which the support ring 2012 is driven by using the blade motor 301 is as follows: a drive gear is disposed on an output shaft of the blade motor 301, an arc-shaped rack is disposed on an outer circumference of the support ring 2012, and the drive gear is engaged with the arc-shaped rack to transmit a drive force of the blade motor 301 to the support ring 2012. Since the support ring 2012 is fixedly connected with the column 100, the blade body 2011 is rotated around the column 100 together with the blade motor 301 under the drive of a reactive force.

Preferably, the above support ring 2012 may be used as a part of the blade such that the blade may have a movable portion and a fixed portion. That is, the support ring 2012 as a fixed portion is connected with the column 100, and the blade body 2011 as a movable portion rotatably cooperates with the support ring 2012. In addition, the above support ring 2012 may also be used as an independent component to realize rotatable cooperation between the blade and the column 100. That is, the support ring 2012 as an independent component is fixed to the column 100, and the blade is in rotatable cooperation with the support ring 2012. In this sense, the whole blade rotates around the column 100. Certainly, the blade motor 301 is also disposed in the blade, and an output shaft of the blade motor 301 drives the blade to rotate relative to the support ring 2012 through engagement between the support ring 2012 and the drive gear.

Certainly, the blades 201 in the blade unit 200 are all rotatably cooperated with the column 100 through the support ring 2012 in this example. In an actual assembly process, it is not required that all blades adopt such rotatable structural design. If some blades 201 do not need to rotate, these blades may be fixedly connected with the column directly, which is common knowledge in the art and will not be repeated herein. When all blades 201 are rotatable, some of them may be made non-rotatable. Therefore, the blades 201 discussed below all are rotatable.

Embodiment 2

The basic structure in this embodiment is same as that of Embodiment 1 except that: as shown in FIGS. 3 to 9, there are N blades 201 on the above single column 100, and the N blades 201 are all divided into M blade groups in sequence, where N is an integer greater than 2 and M is an integer less than N and greater than 1. Furthermore, in the M blade groups, a blade group with a number of blades 201 greater than 2 comprises at least one reference blade 201-0 and at least one movable blade 201-S, that is, at least one blade 201 in the blade group is the reference blade 201-0, and the remaining blades 201 are the movable blades 201-S. For example, a blade group of the M blade groups comprises five blades 201. In the blade group, a blade 201 at a middle position is the reference blade 201-0, above which an upper first movable blade 201-S 1 and an upper second movable blade 201-S2 are disposed in a spacing sequentially, and below which a lower first movable blade 201-S3 and a lower second movable blade 201-S4 are disposed in a spacing sequentially.

The support ring 2012 of the reference blade 201-0 is fixedly connected with the column 100, and the blade body 2011 of the reference blade 201-0 is rotatably cooperated with the support ring 2012, so that the blade body 2011 of the reference blade 201-0 rotates around the column 100 only along the circumferential direction of the column 100. The support rings 2012 of the four movable blades 201-S are connected with the column 100 through their respective corresponding axial movement mechanisms. That is, the movable blades 201-S are moved axially through the corresponding axial movement mechanisms 302 in the blade drive unit 300. Thus, the axial movement mechanisms 302 can drive the support rings 2012 of the movable blades to move along the axial direction of the column 100. In this way, on one hand, the blade bodies 2011 of the movable blades 201-S can be rotatably cooperated with their respective corresponding support rings 2012 to realize the rotation along the circumferential direction of the column 100, and on the other hand, the support rings 2012 can drive the blade bodies 2011 to move along the axial direction of the column 100 through the axial movement mechanism 302. An overall effect achieved by the above movable blades 201-S is that the blade bodies 2011 of the five blades 201 can all rotate along the circumferential direction of the column 100, and four movable blades 201-S can move toward the reference blade 201-0 or restore away from the reference blade 201-0.

Preferably, a blade 201 at a middle position in a same blade group is disposed as the reference blade 201-0 such that a total stroke in which various movable blades 201-S move toward the reference blade 201-0 is smaller. Certainly, any blade 201 in the blade group may be taken as the reference blade 201-0. For example, in a blade group comprising five blades 201, the first blade 201 from top to bottom may be taken as the reference blade 201-0, and four blades 201 located below the reference blade 201-0 may be taken as the movable blades 201-S; or the second blade 201 from top to bottom may be taken as the reference blade 201-0, and one blade 201 located above the reference blade 201-0 and three blades 201 located below the reference blade 201-0 may be taken as the movable blades 201-S; or the fourth blade 201 from top to bottom may be taken as the reference blade 201-0, and three blades 201 located above the reference blade 201-0 and one blade 201 located below the reference blade 201-0 may be taken as the movable blades 201-S; or the fifth blade 201 from top to bottom may be taken as the reference blade 201-0, and four blades 201 located above the reference blade 201-0 may be taken as the movable blades 201-S.

Preferably, the total number of the blades 201 in the above single blade group may be 2, 3, 4, 5, 6 or more.

Further, when the total number of blades 201 is an odd number, a blade 201 at a middle position is selected as the reference blade 201-0, so that an axial movement path of the movable blades 201-S is short, thereby reducing moving error and control difficulty.

Embodiment 3

Figure 14:
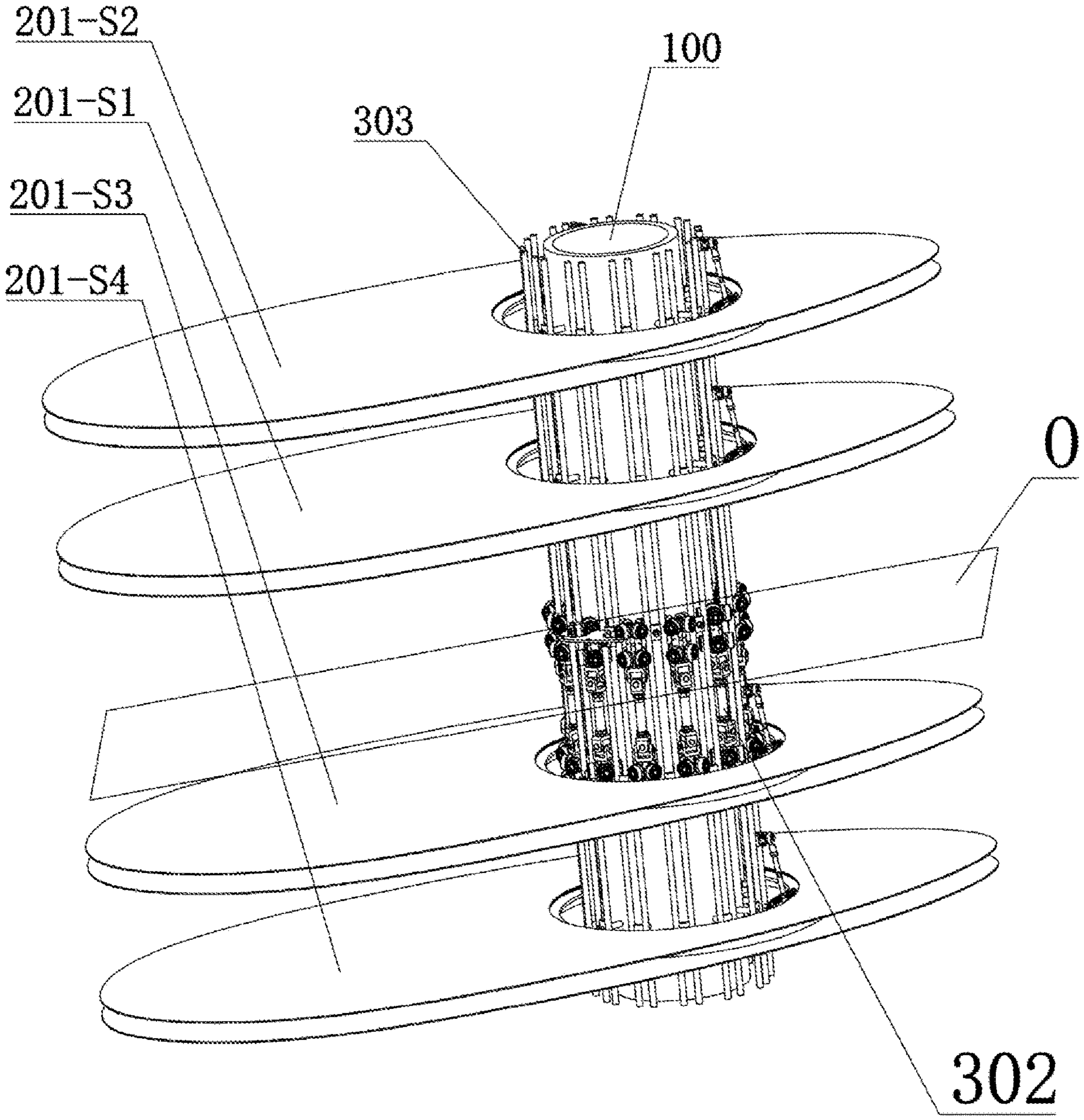
FIG. 14 is a structural schematic diagram illustrating a separated state of another blade unit in FIG. 3.

The basic structure in this embodiment is same as that of Embodiment 2 except that: as shown in FIG. 14, the reference blade 201-0 may not be disposed in the blade group comprising one or more blades, but a virtual reference plane O is preset. All blades 201 in the blade group move toward the reference plane O through the axial movement mechanisms 302 to realize a display effect of a flower pattern or restore from a gathered state of the flower pattern to an initial state.

Particularly, when the number of blades 201 in a single blade group is an even number, the reference blade 201-0 cannot be selected at a middle position in the axial direction. Therefore, it is required to set such a reference plane O, and a plane where any point in a region corresponding to the blade group along an axis of the column 100 is located may be selected as the above reference plane O.

Preferably, in consideration of symmetry of receiving force, a midpoint is selected at an axially-centered position of the blade group, and a virtual reference plane O is formed by passing through the midpoint. The blades 201 in the blade group are equally divided into upper and lower portions along the axial direction to facilitate up and down symmetrical designing during movement of the blades 201. Obviously, after the reference blade 201-0 in the above Embodiment 2 is replaced with the reference plane O, all blades 201 in the blade group are movable blades 201-S.

Certainly, based on the comprehensive consideration of different aspects such as position, height and relevance of adjacent components and blade movement stroke during assembly of blades 201, it is possibly allowed to set only one reference blade 201-0, or a plurality of reference blades 201-0, or one reference plane O or a plurality of reference planes O, or a combination of at least one reference blade 201-0 and at least one reference plane O in one blade group. The above selection of the reference plane O and/or the reference blade 201-0 is based on the preferred changes of the above technical solution of the present invention.

Embodiment 4

Figure 19:
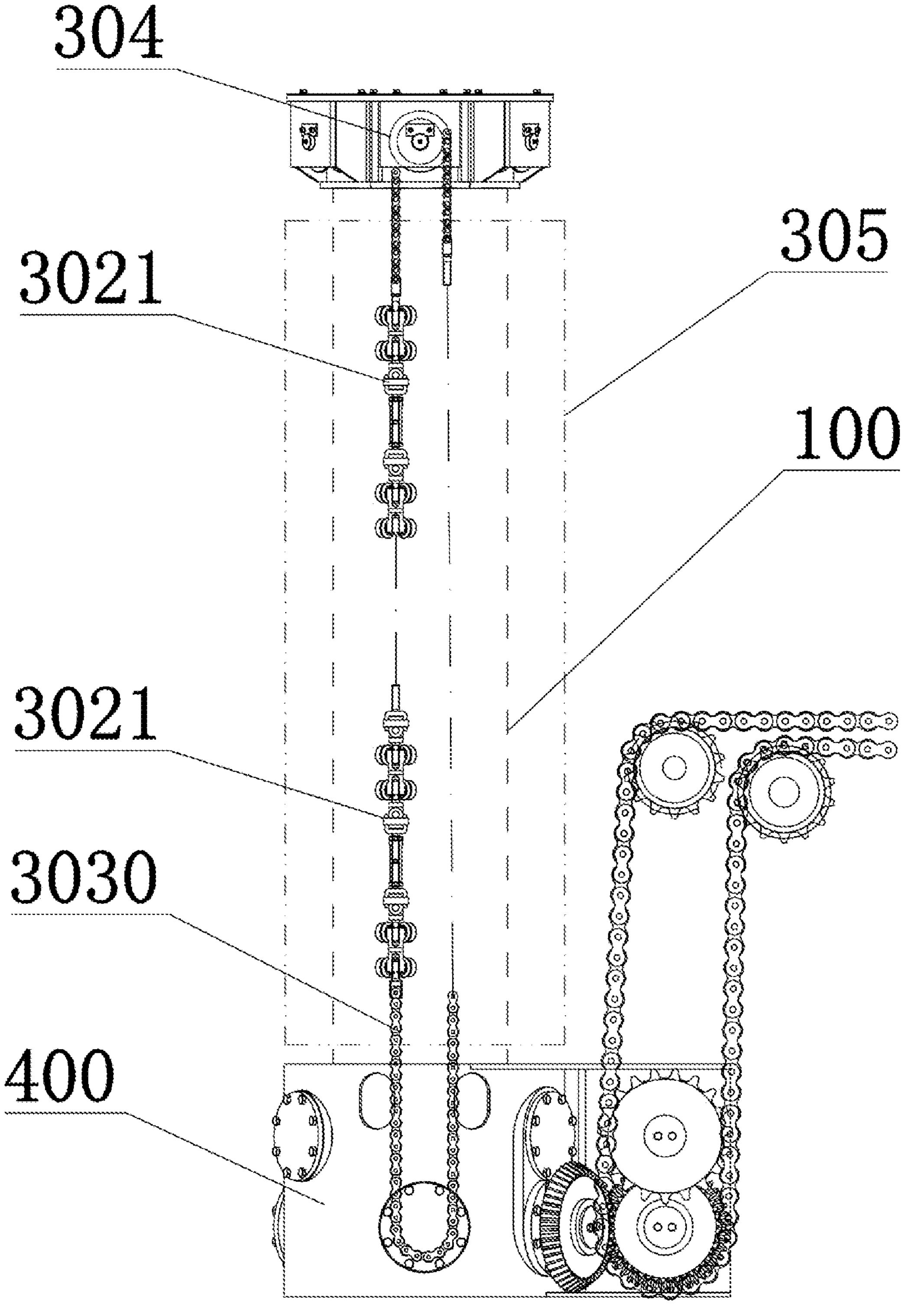
FIG. 19 is a structural schematic diagram illustrating a single traction chain mounted onto a column according to the present invention.

The basic structure in this embodiment is same as that of Embodiment 2 except that: as shown in FIG. 19, the axial movement mechanism 302 comprises a traction chain 3021 extending along the axial direction of the column 100, the support ring 2012 of the movable blade 201-S is fixedly connected with the traction chain 3021, and the traction chain 3021 moves only along the axial direction of the column 100 to drive the movable blade 201-S fixedly connected on the traction chain 3021 to move along the axial direction of the column 100.

Specifically, a limiting mechanism and a traction chain drive mechanism are required for realizing the movement of the above traction chain 3021 only along the axial direction of the column 100. However, the limiting mechanism of the traction chain 3021 may implement a limiting function through a guide rail, a guide groove or a guide wheel, or the like disposed additionally, and the traction chain drive mechanism may be implemented in a conventional drive manner such as a motor plus a drive gear, or a motor plus a sprocket wheel, or a hydraulic cylinder, or the like. Obviously, the movement of the traction chain 3021 only along the axial direction of the column 100 may be realized by adopting many conventional technologies. Those of ordinary skill in the art may realize the movement of the traction chain 3021 only along the axial direction of the column 100 by adopting the existing technology in the art or even in a well-known art. Although a specific conventional structure for driving the traction chain 3021 is not shown in the embodiment, this does not hinder those of ordinary skill in the art from reproducing the technology for realizing the movement of traction chain 3021 only along the axial direction of the column 100. Therefore, no redundant descriptions are made herein.

Embodiment 5

The basic structure in this embodiment is same as that of Embodiment 2 except that: as shown in FIG. 2, there are, for example, 45 blades 201 on a single column 100, every five blades 201 form one blade group, and thus the 45 blades 201 are divided into nine blade groups sequentially from top down; a blade 201 at a middle position in any one blade group is selected as the reference blade 201-0, an upper first movable blade 201-S1 and a lower first movable blade 201-S3 are disposed at the upper and lower sides of the reference blade 201-0 respectively, an upper second movable blade 201-S2 is disposed above the upper first movable blade 201-S1, and a lower second movable blade 201-S4 is disposed below the lower first movable blade 201-S3; a moving stroke in which the upper second movable blade 201-S2 moves toward the reference blade 201-0 is greater than a moving stroke in which the upper first movable blade 201-S1 moves toward the reference blade 201-0, and is substantially twice the moving stroke of the upper first movable blade 201-S1; and a moving stroke in which the lower second movable blade 201-S4 moves toward the reference blade 201-0 is greater than a moving stroke in which the lower first movable blade 201-S3 moves to the reference blade 201-0 and is substantially twice the moving stroke of the lower first movable blade 201-S3. Specifically, the moving strokes of the upper first movable blade 201-S1 and the lower first movable blade 201-S3 are 350 mm, and the moving strokes of the upper second movable blade 201-S2 and the lower second movable blade 201-S4 are 700 mm.

Embodiment 6

To visually construct a contour of the three-dimensional sculpture, for example, a human-shaped sculpture, using the outer contours of a plurality of blades on the columns 100, part or all of the columns 100 needs to bend in a three-dimensional space to present a three-dimensional visual effect, that is, part or all of the axis of the column 100 is presented in a curved state. In this way, part or all of the columns 100 is presented as a curved shaft. Of course, the shafts whether a vertical straight shaft or a bending curved shaft, are collectively referred to as the column 100.

Embodiment 7

Figure 20:
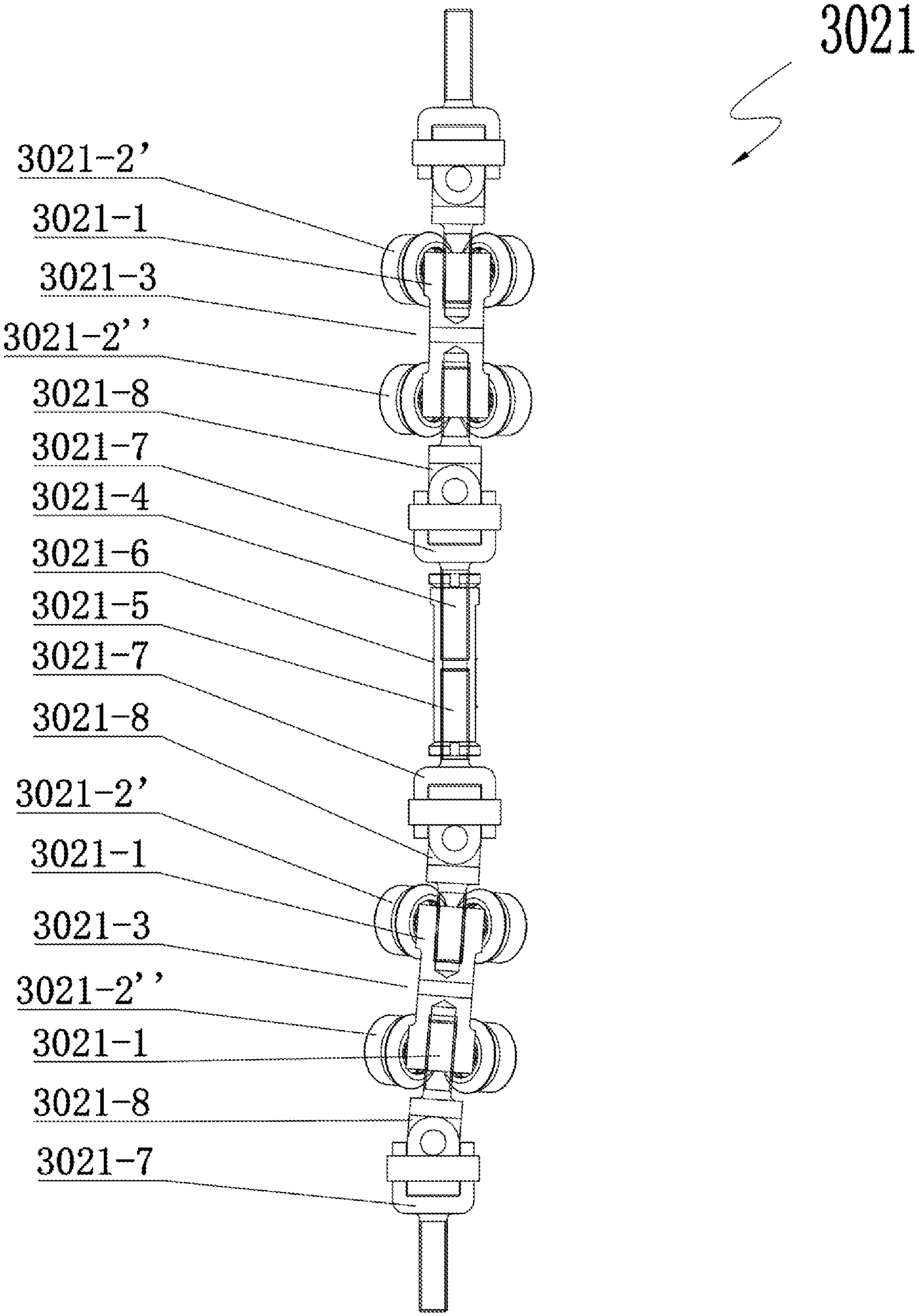
FIG. 20 is a structural schematic diagram illustrating a part of a traction chain according to the present invention.
Figure 21:
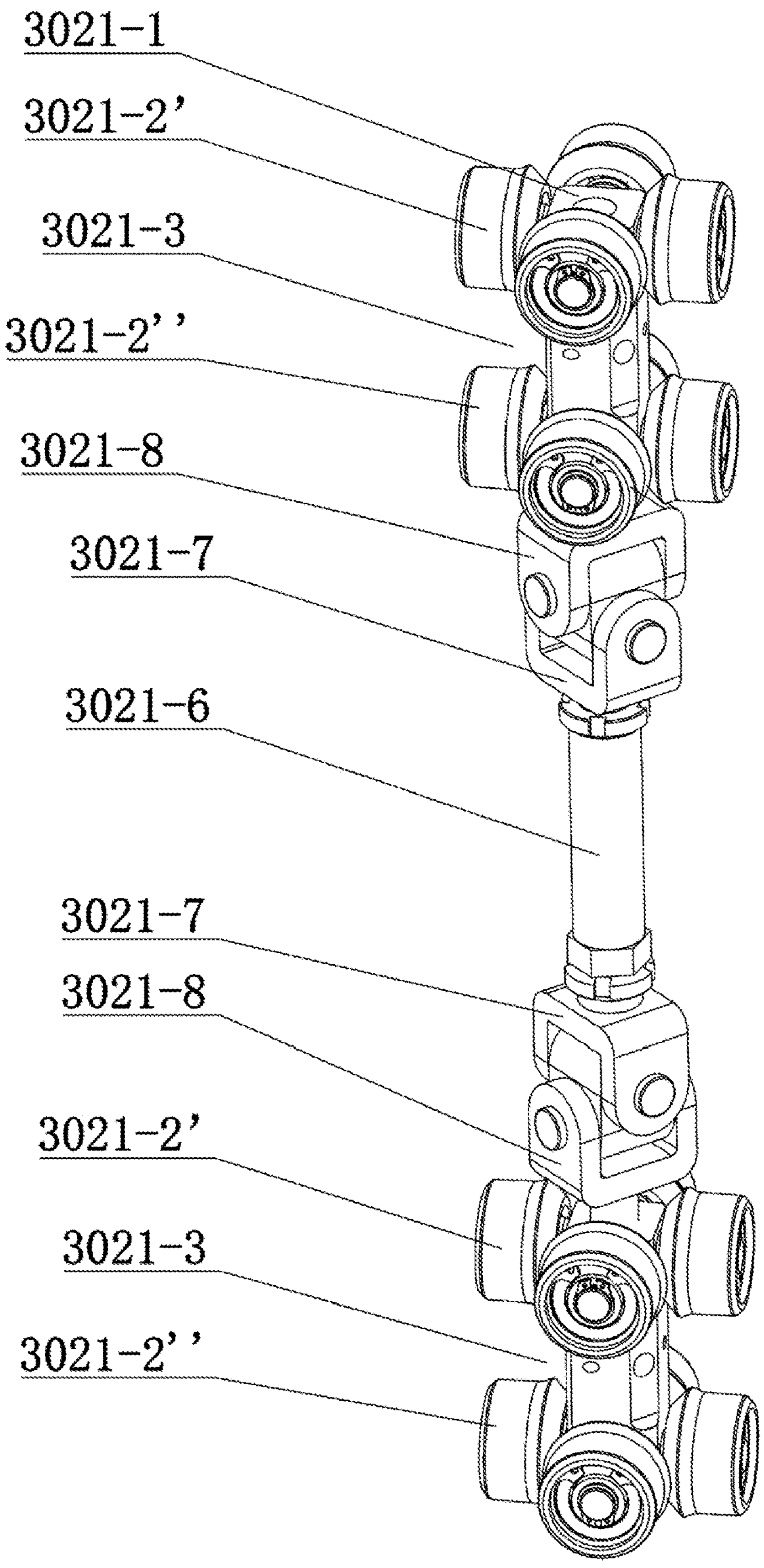
FIG. 21 is a structural schematic diagram illustrating a part of a traction chain in another direction according to the present invention.

The basic structure in this embodiment is same as that of Embodiment 4 except that: as shown in FIGS. 19 to 21, to apply the traction chain 3021 to the bent column 100, that is, to enable a length direction of the traction chain 3021 to extend along the curved axis of the column 100, and to avoid an interference between the traction chain 3021 and other accessories at the bent portion of the column 100 and different strokes of different traction chains 3021 at the bent portion, an improvement is made to the structure of the traction chain 3021: the traction chain 3021 is formed by sequentially connecting at least a plurality of roller units and telescoping units disposed alternately, and both ends of any telescoping unit are connected with the adjacent roller units by universal joints respectively.

Preferably, to reduce the number of traction chains 3021, the traction chain 3021 may be of a head-tail-connected annular structure. A fixed pulley 304 matched with the traction chain 3021 is disposed at the top of the column 100, and an upper portion of the traction chain 3021 is wound on the fixed pulley 304. In this case, after being passed through the fixed pulley 304, one annular traction chain 3021 will have two sections in which one section ascends while the other descends. Therefore, two traction chain drive mechanisms originally required for driving the traction chains to move can be reduced to one traction chain drive mechanism.

Preferably, the traction chain drive mechanism is disposed on the bearing unit 400. In addition to winding the top of the annular traction chain 3021 on the fixed pulley 304, the bottom of the traction chain 3021 may be connected with the traction chain drive mechanism through a reversing wheel. Specifically, the traction chain drive mechanism may be a motor and a sprocket wheel, the traction chain is wound on the sprocket wheel, such that the motor drives the sprocket wheel to rotate so as to realize forward and reverse pulling for the traction chain.

Preferably, a roller unit and a telescoping unit are disposed on the traction chain 3021 to facilitate mounting and adjustment of the movable blade. When the traction chain 3021 is located at the position of the fixed pulley 304, the roller unit and the telescoping unit are not necessary, but an ordinary chain 3030 may be used. Similarly, a portion of the traction chain 3021 extending onto the bearing unit 400 is used only to connect with the traction chain drive mechanism on the bearing unit 400, therefore, the roller unit and the telescoping unit are not required. Therefore, the whole annular traction chain comprises but not limited to at least one roller unit, at least one length-adjustable telescoping unit and at least one chain 3030 in which heads and ends are connected in sequence. Certainly, as described above, the roller unit and the telescoping unit are disposed on the traction chain 3021 to facilitate the mounting of the movable blade, so that interferential collision between the movable blade and the column or fixed accessories on the column is avoided while the movable blade is guaranteed to move along a predetermined path. Particularly, when the axis of the column 100 is a curve, it is highly possible that the conventional pull of the chain will lead to collision between the movable blade and the bent portion of the column 100, resulting in damage to the equipment. Therefore, the roller unit and the telescoping unit need to be disposed in a region corresponding to the movable blade on the column 100. Thus, an area in the region of the column 100 where the movable blade is located is selected as a blade mounting region 305. The blade mounting region 305 is an annular region running round the axis of the column 100 by one circle. A portion of the traction chain 3021 located in the blade mounting region 305 is defined as a functional section, and the roller unit and the telescoping unit forming the traction chain 3021 are located in the blade mounting region 305.

In a preferred embodiment, as shown in the drawing, six annular traction chains are disposed on one column and arranged in a spacing along the circumferential direction of the column 100. A fixed pulley 304 is disposed at a position that is at the top of the column 100 and corresponds to each traction chain. Further, six traction chains are all penetrated through the blade mounting region 305, so that all traction chains 3021 form twelve mutually-paralleled functional sections in the blade mounting region 305, and all functional sections are uniformly distributed along the circumferential direction of the column 100.

To realize translation of the roller unit on the guide rail, as a preferred embodiment, the roller unit comprises a roller body 3021-1 and a guide wheel 3021-2 mounted on the roller body 3021-1. The guide wheel 3021-2 comprises a first guide wheel 3021-2' and a second guide wheel 3021-2" spaced apart along an axial direction of the roller body 3021-1. A connection region 3021-3 for connecting the movable blade 201 is reserved between the first guide wheel 3021-2' and the second guide wheel 3021-2" on the roller body 3021-1.

Specifically, there are four first guide wheels 3021-2' and four second guide wheels 3021-2". The four first guide wheels 3021-2' are uniformly distributed along a circumferential direction of the roller body 3021-1, the four second guide wheels 3021-2" are also uniformly distributed along the circumferential direction of the roller body 3021-1. Any of the second guide wheels 3021-2" corresponds to one of the first guide wheels 3021-2' along the axial direction of the roller body 3021-1. Therefore, the four first guide wheels 3021-2' and the four second guide wheels 3021-2" are in one-to-one correspondence along the axial direction of the roller body 3021-1. Furthermore, outer circumferential surfaces of the two first guide wheels 3021-2' and outer circumferential surfaces of two second guide wheels 3021-2" axially corresponding to the two first guide wheels 3021-2' are enclosed together to form an inner surface of a slide groove slidably cooperating with the guide rail. Similarly, outer circumferential surfaces of the remaining two first guide wheels 3021-2' and outer circumferential surfaces of two second guide wheels 3021-2" axially corresponding to the remaining two first guide wheels 3021-2' are also enclosed together to form an inner surface of a slide groove facing toward an opposite direction. Therefore, the two slide grooves facing toward opposite directions jointly formed by the four first guide wheels 3021-2' and the four second guide wheels 3021-2" are slidably cooperated with two slide surfaces on the guide rail or two components of the guide rail. Finally, good slidable cooperation of the roller body 3021-1 on the guide rail can be realized and the roller body 3021-1 can be constrained on the guide rail to reduce the risk that the roller body 3021-1 is derailed from the guide rail. Certainly, the above guide rail structure needs to be disposed to be matched with the two slide grooves. Based on this, adaptive adjustment of the guide rail may be performed by deforming the guide rail to form a different matching surface, or by cooperation of several components of the guide rail. As a result, in this embodiment, after the above structural improvement is made to the roller unit, a corresponding adaptive adjustment may be made to the guide rail. The adjustment may be realized simply based on the common knowledge in the field of guide rails, and thus the guide rail will not be described in detail in this embodiment.

To realize the translation of the roller unit on the guide rail, as a preferred embodiment, the roller unit comprises a roller body 3021-1, a guiding slide groove matched with the guide rail is formed by inwardly recessing a position that is on the roller body 3021-1 and corresponds to the guide rail, and thus the guide rail can cooperatively slide in the slide groove.

To realize the translation of the roller unit on the guide rail, as a preferred embodiment, the roller unit comprises a roller body 3021-1, a slide block matched with the guide rail is mounted at a position that is on the roller body 3021-1 and corresponds to the guide rail, and thus the guide rail can slidably cooperate with the slide block.

Preferably, the telescoping unit comprises an upper adjusting rod 3021-4, a lower adjusting rod 3021-5 and an adjusting sleeve 3021-6. One end of the upper adjusting rod 3021-4 is extended into one end of the adjusting sleeve 3021-6 and thread-connected with the adjusting sleeve 3021-6, and one end of the lower adjusting rod 3021-5 is extended into the other end of the adjusting sleeve 3021-6 and thread-connected with the adjusting sleeve 3021-6. Furthermore, along with the rotation of the adjusting sleeve 3021-6, the upper adjusting rod 3021-4 and the lower adjusting rod 3021-5 are synchronously linked along an axial direction of the adjusting sleeve 3021-6, so that the upper adjusting rod 3021-4 and the lower adjusting rod 3021-5 move close to or away from each other. By adopting the telescoping unit, the length of each position of the traction chain 3021 may be effectively adjusted along the length direction of the traction chain 3021, that is, a distance between two roller units may be adjusted.

Enabling the upper adjusting rod 3021-4 and the lower adjusting rod 3021-5 to move close to or away from each other along with the rotation of the adjusting sleeve 3021-6 can be cooperatively performed through selection of thread rotation directions between the upper adjusting rod 3021-4 and the adjusting sleeve 3021-6 and between the lower adjusting rod 3021-5 and the adjusting sleeve 3021-6. The upper adjusting rod 3021-4 and the lower adjusting rod 3021-5 have right-handed external threads and left-handed external threads respectively, positions that are in the adjusting sleeve 3021-6 and correspond to the upper adjusting rod 3021-4 and the lower adjusting rod 3021-5 are provided with internal threads corresponding to the upper adjusting rod 3021-4 and the lower adjusting rod 3021-5 respectively. As a result, along with the rotation of the adjusting sleeve 3021-6, when the upper adjusting rod 3021-4 moves upwardly, the lower adjusting rod 3021-5 moves downwardly, and thus the upper adjusting rod 3021-4 and the lower adjusting rod 3021-5 can be moved away from each other. On the contrary, when the upper adjusting rod 3021-4 moves downwardly, the lower adjusting rod 3021-5 moves upwardly, and thus the upper adjusting rod 3021-4 and the lower adjusting rod 3021-5 can be moved close to each other.

Preferably, the universal joint comprises a male connector 3021-7, a female connector 3021-8, a rotary core block and a rotary shaft. The male connectors 3021-7 of two universal joints are fixedly connected with ends of the upper adjusting rod 3021-4 and lower adjusting rod 3021-5 located outside the adjusting sleeve 3021-6 respectively. Specifically, the male connector 3021-7 of one of the universal joints and the upper adjusting rod 3021-4 are integrally formed, and the male connector 3021-7 of the other universal joint and the lower adjusting rod 3021-5 are integrally formed. The female connectors 3021-8 of the universal joints are connected with their corresponding roller body 3021-1 respectively, for example, thread-connected with their corresponding roller body 3021-1 by bolts. That is, an integral bolt is disposed on the female connector 3021-8, and thread-fixed into a threaded hole on the roller body 3021-1. The male connector 3021-7 is hinged with the rotary core block along a first rotational plane through one rotary shaft, the female connector 3021-8 is hinged with the rotary core block along a second rotational plane through the other rotary shaft, where the two rotational planes are intersected with each other, and preferably, intersected in such a way that they are perpendicular to each other. In this way, the roller unit and the telescoping unit are movably connected by the universal joint. At this time, an angle between the roller unit and the telescoping unit is adjustable.

Further, an end of the roller body 3021-1 close to the female connector 3021-8 of the universal joint is thread-connected with a bolt, and the female connector 3021-8 is rotatably mated with the bolt along a circumferential direction. Specifically, an annular fitting slot is disposed on the bolt, and a fitting ring mated with the annular fitting slot is disposed on the female connector 3021-8. In this case, the annular fitting slot is rotatably mated with the fitting ring to enable the female connector 3021-8 to be rotatably mated with the bolt along a circumferential direction of an axis of the female connector 3021-8.

Embodiment 8

Figure 15:
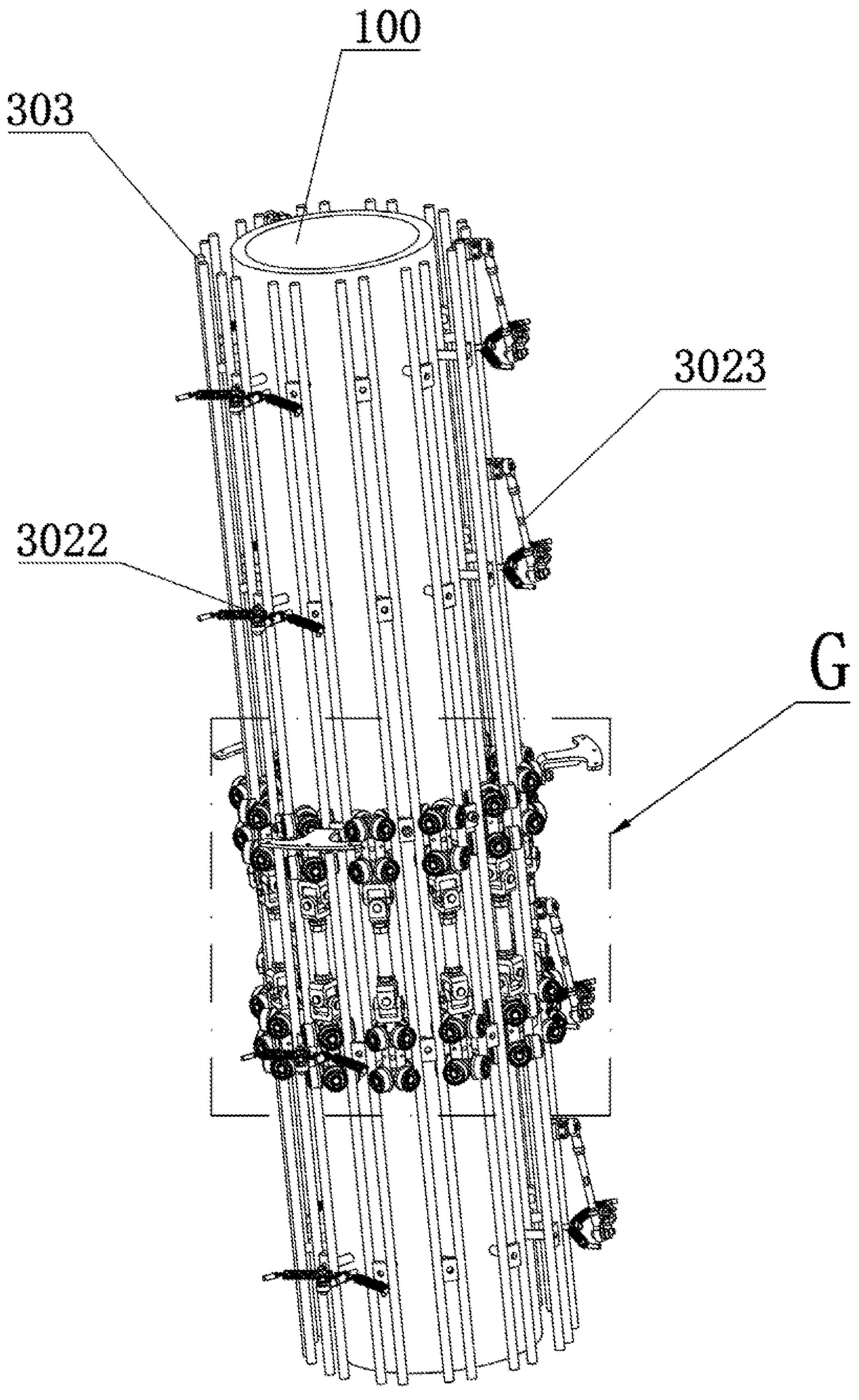
FIG. 15 is a schematic diagram illustrating a structure without a blade unit in FIG. 3.
Figure 16:
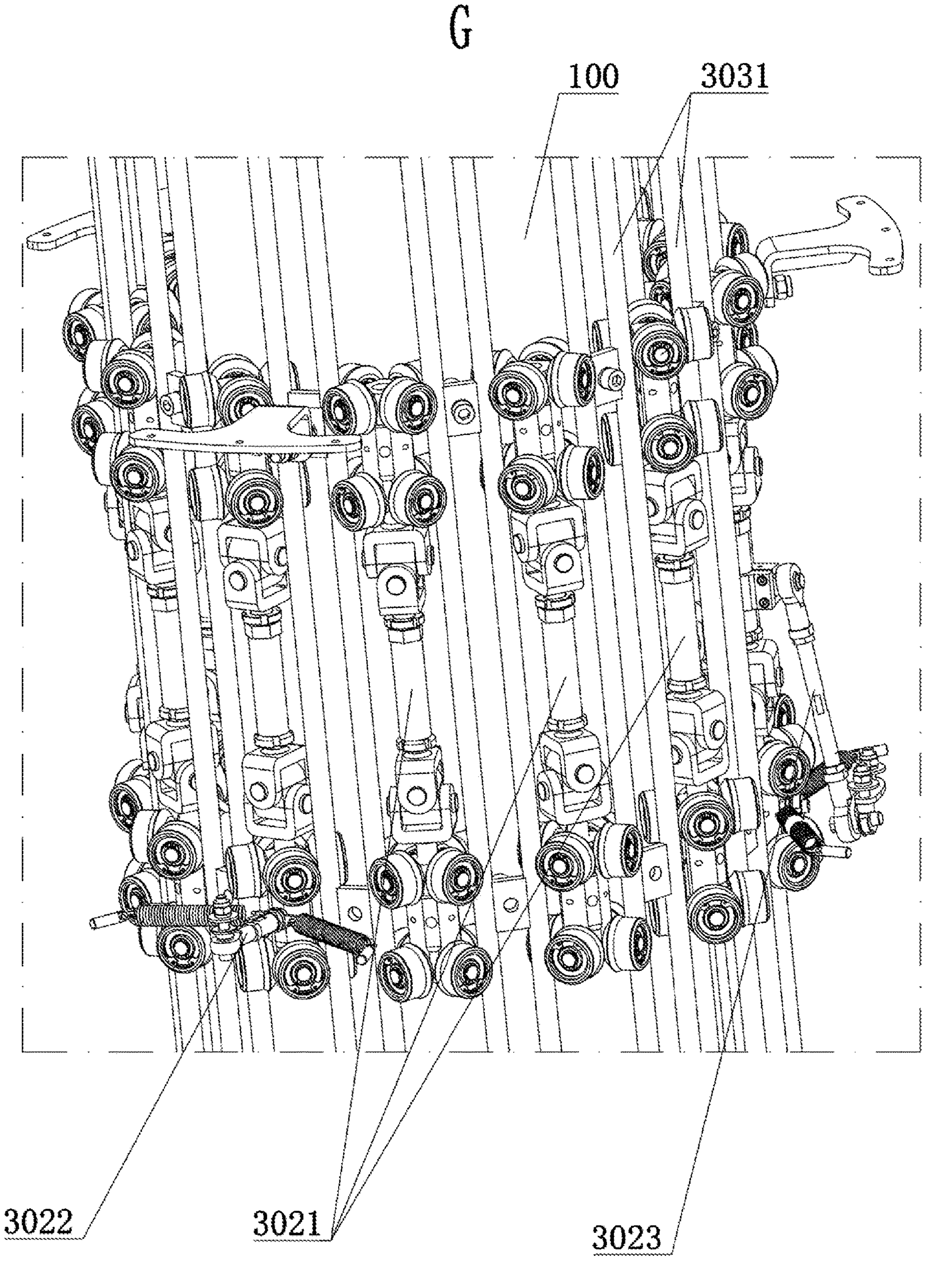
FIG. 16 is a partially-enlarged view of a region "G" in FIG. 15.

As shown in FIGS. 15 to 16, to enable the above traction chain 3021 to zigzag on an outer surface of the bent column 100 along the axial direction of the column 100, a guide rail 303 is disposed at a position that is on the column 100 and corresponds to each traction chain 3021 and extends along the axial direction of the column 100. The traction chain 3021 is cooperated on the corresponding guide rail 303 and moved along a length direction of the guide rail 303 under the guide of the guide rail 303.

Specifically, the guide rail 303 comprises two guide rods 3031 that are paralleled to each other and suspended over the outer surface of the column 100, a moving path of the traction chain 3021 is formed between the two paralleled guide rods 3031, and the traction chain 3021 is placed between the two guide rods 3031 and slidably cooperated with the two guide rods 3031 along the moving path of the traction chain 3021. Alternatively, when the roller unit is disposed on the traction chain 3021, the guide wheels 3021-2 on the traction chain 3021 are rollably cooperated with their corresponding guide rods 3031 respectively. For example, the roller unit on the above traction chain 3021 comprises four first guide wheels 3021-2' and four second guide wheels 3021-2", where two first guide wheels 3021-2' and two second guide wheels 3021-2" are abutted against the above first guide rod and are rollably cooperated with the guide rod 3031 respectively, and the remaining two first guide wheels 3021-2' and the remaining two second guide wheels 3021-2" are also abutted against the other guide rod 3031 and are rollably cooperated with the guide rod 3031 respectively. At this time, an inwardly-recessed slide groove for cooperating with the first guide rod 3031 for movement guiding is formed between two first guide wheels 3021-2 of the four first guide wheels 3021-2' facing toward the first guide rod 3031, and an inwardly-recessed slide groove is also formed between remaining two first guide wheels 3021-2'. Therefore, the two slide grooves may be taken as an H-shaped slide rail, and thus the roller unit can be well limited between the two mutually-paralleled guide rods 3031, and prevented from being separated from the moving path of the traction chain 3021 between the two guide rods 3031. The traction chain 3021 of this structure can simplify the structure of the guide rail 303 and add to the stable cooperation between the traction chain 3021 and the guide rail 303, thereby greatly lowering a risk that the traction chain 3021 is separated from the guide rail 303.

Further, to prevent a part of the roller unit of the traction chain 3021 against separating from the moving path of the traction chain 3021 due to local deformation of the moving path resulted from bending of the guide rod 3031 receiving a force, an abutting block 3032 is disposed at the other side of any guide rod of the guide rail 303 away from the guide wheel 3021-2 of the traction chain 3021, and a support force of the abutting block 3032 acting on the guide rod 3031 and a pressure of the guide wheel 3021-2 of the traction chain 3021 acting on the guide rod 3031 are forces of mutual action and reaction. That is, the active force of the two first guide wheels 3021-2' and the active force of the two second guide wheels 3021-2" acting on the guide rod 3031 at the same time counteract the active force of the abutting block 3032 acting on the guide rod 3031 so as to allow the guide rod 3031 to be under uniform force.

Further, the number of the guide rails 303 is equal to the number of the traction chains 3021, all guide rails 303 are disposed in a spacing along the circumferential direction of the column 100 and all traction chains 3021 are cooperated with their corresponding guide rails 303 respectively. The abutting block 3032 is disposed between any two adjacent guide rails 303 and fixedly connected with the column 100 by a bolt, and arc-shaped end faces matched with the guide rods 3031 are formed by inwardly recessing both end faces of the abutting block 3032 corresponding to two left and right adjacent guide rails 303 respectively.

Embodiment 9

As shown in FIGS. 5 to 9, to ensure that the movable blade 201-S in the above blade group can move axially on the bent column 100 and present a horizontal state at a particular position of the moving path of the movable blade 201-S during its movement along the axial direction of the column 100, the movable blade 201-S needs to be mounted in such a way that the movable blade 201-S is movable along with the traction chain 3021 and adjustable in position. One reference connection piece 3022 and two adjustable connection pieces 3023 are disposed between the movable blade 201-S and the traction chain 3021 and uniformly distributed along the circumferential direction of the column 100.

The reference connection piece 3022 comprises a reference connection screw rod 3022-1 and two first leveling springs 3022-2. A front end of the reference connection screw rod is connected with a corresponding traction chain 3021 on the column 100.

Specifically, one end of the reference connection screw rod 3022-1 is thread-fixed to a connection region that is on the roller body 3021-1 of the traction chain 3021 and between the first guide wheel 3021-2' and the second guide wheel 3021-2", and the other end of the reference connection screw rod 3022-1 is connected with the support ring 2012 of the movable blade 201-S by a universal joint. At the same time, the two first leveling springs 3022-2 are horizontally disposed at both sides of the reference connection screw rod 3022-1 respectively, one end of the first leveling spring 3022-2 is connected with the traction chain 3021, and the other end of the leveling spring 3022-2 is connected with the support ring 2012.

Specifically, one end of the first leveling spring 3022-2 is hooked on a hooking hole of an annular hooking ring, and the other end of the first leveling spring 3022-2 is hooked on a pull hole on the support ring 2012. The reference connection screw rod 3022-1 is penetrated through a mounting hole on the annular hooking ring and fixedly connected with the roller body 3021-1 to closely clamp the annular hooking ring between the reference connection screw rod 3022-1 and the roller body 3021-1.

The adjustable connection piece 3023 comprises an adjustable pull rod 3023-1 and two second leveling springs 3023-2. A lower end of the adjustable pull rod 3023-1 is rotatably connected with the support ring 2012 by a universal joint, and an upper end of the adjustable pull rod 3023-1 extends upwardly to be above the movable blade 201-S and is rotatably connected with the corresponding traction chain 3021 by another universal joint. The above rotatable connection refers to a rotatable connection realized by adjusting an angle between two components, for example, mating between a ball bearing and a ball-head rod. One end of each of the two second leveling springs 3023-2 is fixedly connected to the support ring 2012, for example, the fixed connection may be realized by cooperation of a hook and hooking hole. The other end of each of the second leveling springs 3023-2 is fixedly connected to the traction chain 3021 corresponding to the adjustable connection piece 3023. The above adjustable pull rod 3023-1 is a telescoping rod with an adjustable length. For example, the adjustable pull rod 3023-1 is composed of front, middle and rear sections. Connectors movably connected with two universal joints are disposed at the front and rear sections of the adjustable pull rod 3023-1 respectively, and the middle section of the adjustable pull rod 3023-1 is located between the front section and the rear section. Both ends of the middle section are provided with external threads respectively, and the front and rear sections of the adjustable pull rod 3023-1 are provided with internal threads matched with the external threads at the ends of the middle section respectively. The front, middle and rear sections of the adjustable pull rod 3023-1 are fixedly connected by thread connections, and the adjustable pull rod 3023-1 may entirely extend or retract along with the rotation of the middle section. Certainly, the adjustable pull rod 3023-1 may also be a hydraulic rod, or a conventional telescoping rod of another form.

Specifically, an embracing hoop 3023-3 is sleeved on the adjusting sleeve 3021-6 in the telescoping unit of the traction chain 3021 and fixedly connected with the adjusting sleeve 3021-6. A universal joint is mounted on the embracing hoop 3023-3, and an upper end of the adjustable pull rod 3023-1 is movably connected with the universal joint. A mounting sheet 3023-4 is fixedly connected on the support ring 2012 by bolts, another universal joint is disposed on the mounting sheet 3023-4, and a lower end of the adjustable pull rod 3023-1 is movably connected with the support ring 2012 by the universal joint.

The above one reference connection piece 3022 and two adjustable connection pieces 3023 are correspondingly connected on three traction chains 3021 respectively, and the three traction chains 3021 can be synchronously pulled to drive the movable blades 201-S to move along with the traction chains 3021. At the same time, the overall structure is made more stable due to presence of three connection points. In addition, the movable blade 201-S may rotate with the reference connection piece 3022 as a supporting point, and the movable blades 201-S located at different positions of the bent column 100 can all remain in a horizontal state in at least one of the positions under the adjustment of the two adjustable connection pieces 3023.

Embodiment 10

Figure 17:
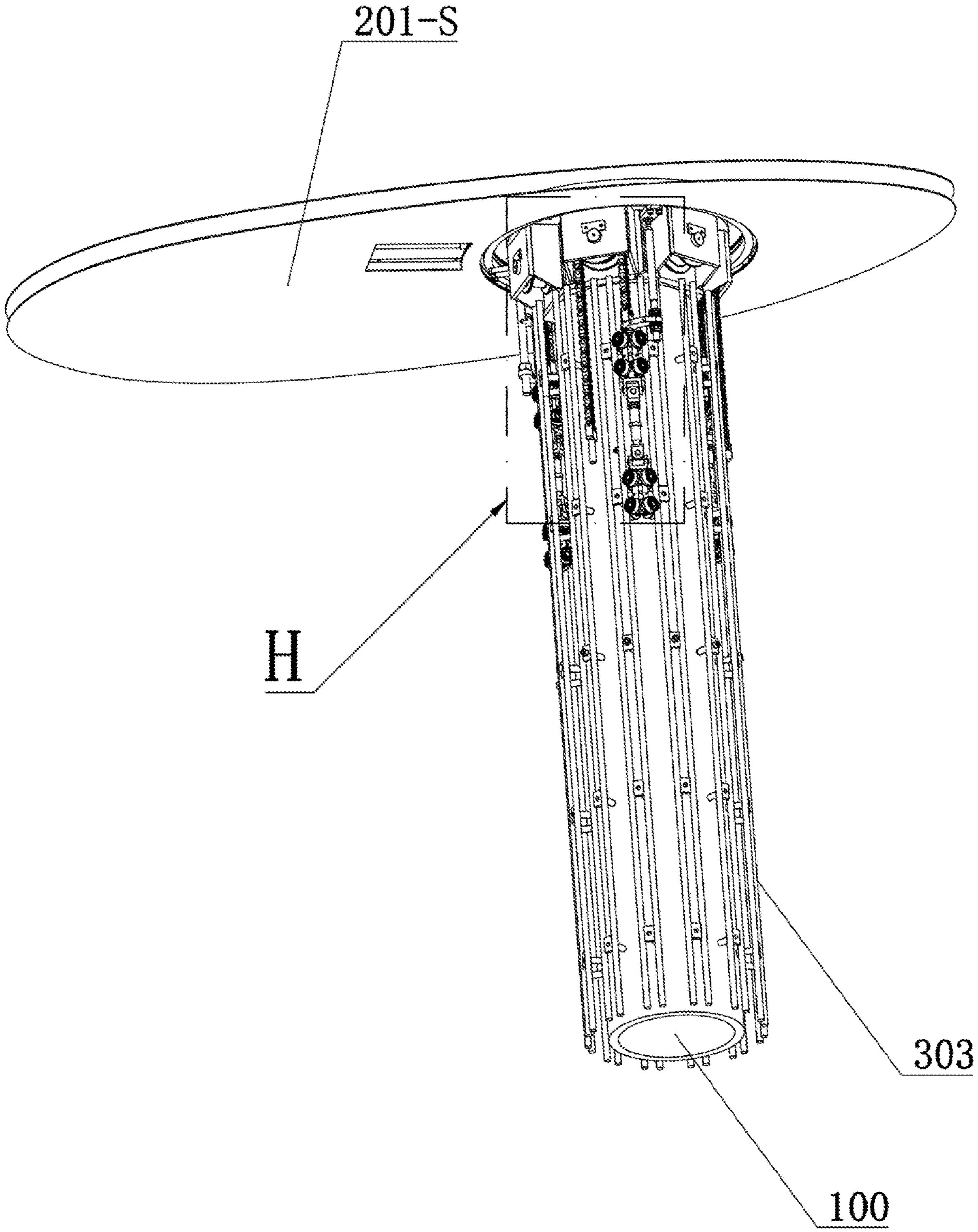
FIG. 17 is a structural schematic diagram illustrating a region where a top movable blade on a column is located according to the present invention.
Figure 18:
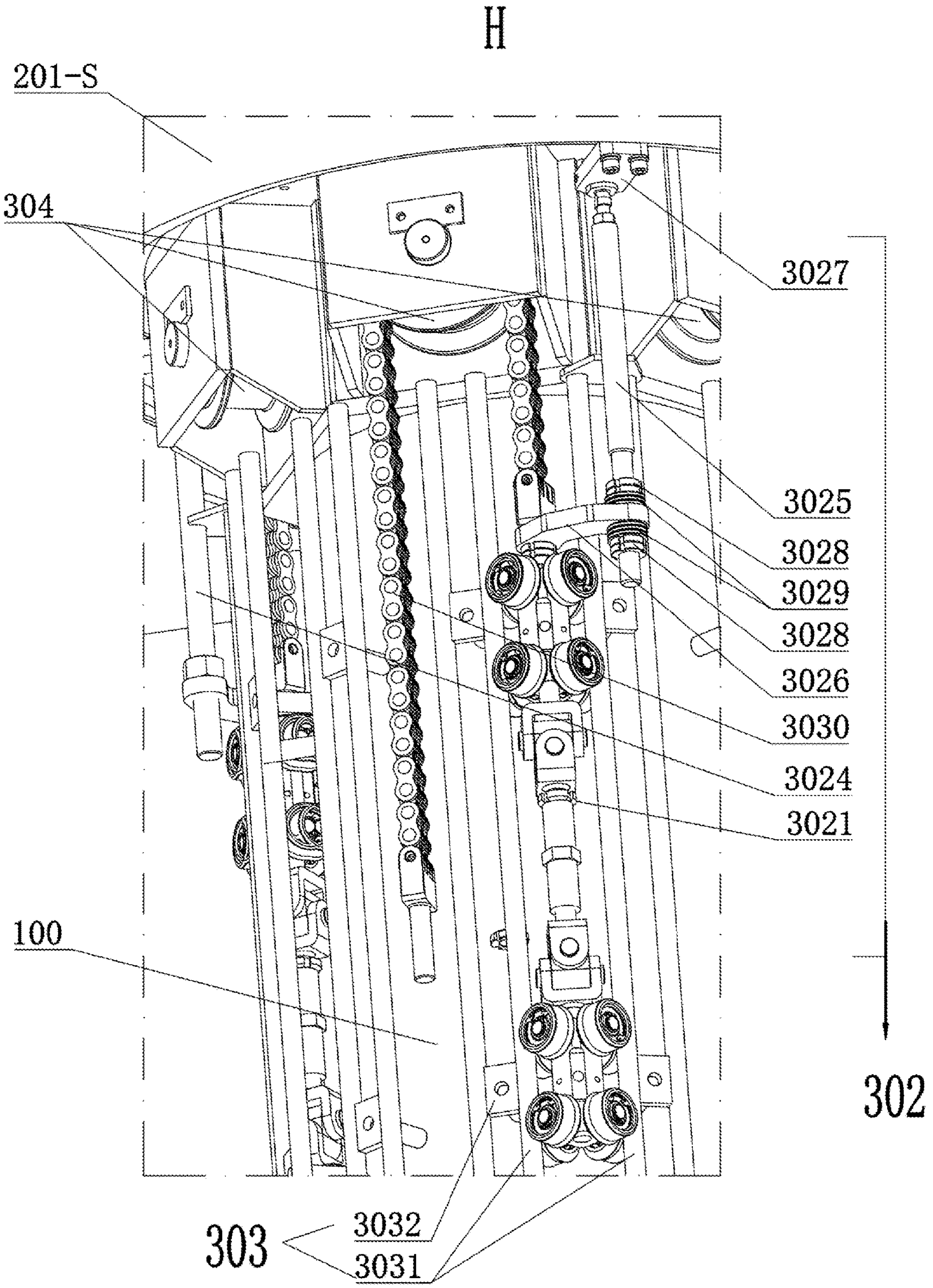
FIG. 18 is a partially-enlarged view of a region "H" in FIG. 17.

As shown in FIG. 17 and FIG. 18, it is assumed that a blade 201 at the top of the column 100 is a movable blade 201-S. In this case, when this blade 201-S is mounted, the blade 201-S is enabled to ascend or descend along with the movement of the traction chain 3021 and an angle of the movable blade 201-S can be adjusted until the movable blade 201-S presents a horizontal state in at least one position during its movement along with the traction chain 3021.

Therefore, the movable blade 201-S at top is to be connected with the traction chain 3021 through a connection mechanism having a specific structure.

Specifically, one reference support rod 3024 and two adjustable support rods 3025 are disposed between the movable blade 201-S at top and the column 100. A lower end of the reference support rod 3024 is fixedly connected with the corresponding traction chain 3021 through a lower connection sheet 3026, an upper end of the reference support rod 3024 is movably connected or rotatably connected with an upper connection sheet 3027 through a universal joint, and the upper connection sheet 3027 is fixedly connected with the support ring 2012 of the movable blade 201-S at top.

A lower connection sheet 3026 is disposed between lower ends of two adjustable support rods 3025 and their corresponding traction chains 3021 respectively, one end of the lower connection sheet 3026 is fixedly connected with the corresponding traction chain 3021, and the other end of the lower sheet 3026 is provided with a mounting hole for the lower end of the adjustable support rod 3025 to pass through. A lock nut 3028 is fixed at both ends of the lower connection piece 3026 on the adjustable support rod 3025 respectively, several butterfly springs 3029 are disposed between the lock nut 3028 and the lower connection sheet 3026, and the butterfly springs 3029 are stacked in sequence and sleeved on the adjustable support rod 3025. The first butterfly spring 3029 and the last butterfly spring 3029 are abutted against the lower connection sheet 3026 and the lock nut 3028 respectively. Thus, a connection position between the adjustable support rod 3025 and the lower connection sheet 3026 may be adjusted by rotating the lock nut, and a position of the adjustable support rod 3025 along its length direction may also be adjusted by increasing or decreasing the butterfly springs 3029. An upper end of the adjustable support rod 3025 extends upwardly along a vertical direction and the upper end of the adjustable support rod 3025 is movably connected or rotatably connected with the upper connection sheet 3027 by a universal joint. The upper connection sheet 3027 is fixedly connected with the support ring 2012 of the movable blade 201-S at top.

Further, the above lock nuts 3028 that are on the adjustable support rod 3025 and located at both sides of the lower connection sheet 3026 are a pair of lock nuts abutted against each other in sequence, that is, a pair of lock nuts 3028 are disposed on the adjustable support rod 3025 and located at both sides of the lower connection sheet 3026 respectively. In this way, a same pair of lock nuts 3028 are made to be abutted against each other to prevent spontaneous rotation of the lock nuts 3028 subjected to an axial reactive force from affecting the connection position between the lower connection sheet 3026 and the adjustable support rod 3025.

To make the connection position between the adjustable support rod 3025 and the corresponding traction chain adjustable, the following conventional examples may be further included in addition to the above preferred embodiment of cooperation of the lock nuts and the butterfly springs.

Example 1: the adjustable support rod 3025 is a multi-section rod or a telescoping rod with an adjustable length, such as a telescopic hydraulic rod.

Example 2: a plurality of connection joints are disposed in a spacing at the lower end of the adjustable support rod 3025, and the lower connection sheet 3026 may be fixedly connected with any one of the connection joints to change the connection position.

Example 3: a detachable connection head is disposed at the lower end of the adjustable support rod 3025, and the connection head may be arbitrarily replaced to adjust the connection position between the lower connection sheet 3026 and the lower end of the adjustable support rod 3025.

Certainly, many conventional technologies in the prior art may be adopted to adjust a vertical height of the connection position between the adjustable support rod 3025 and the lower connection sheet 3026, which will not be repeated in detail herein.

Embodiment 11

Figure 4:
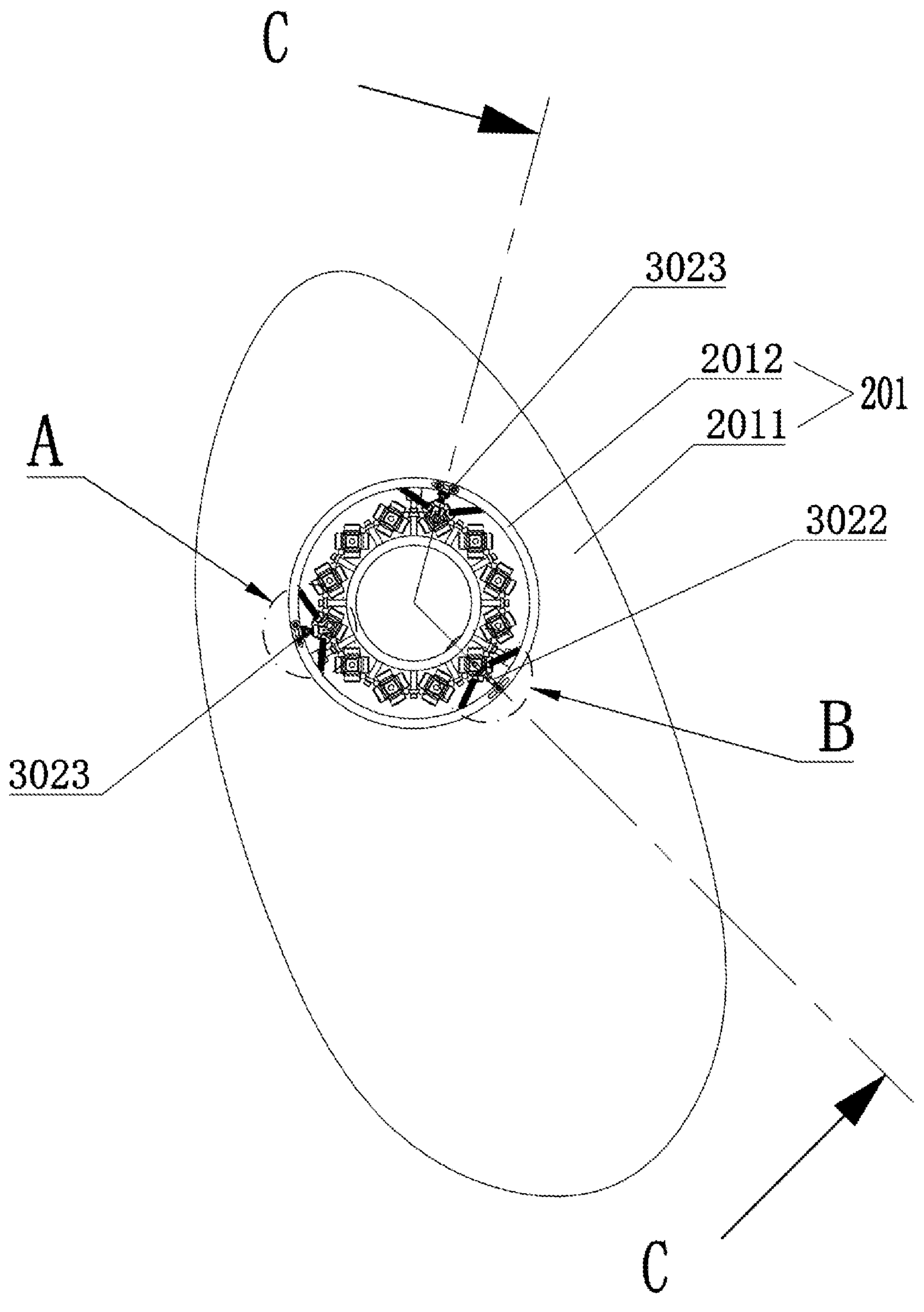
FIG. 4 is a top view of FIG. 3.
Figure 5:
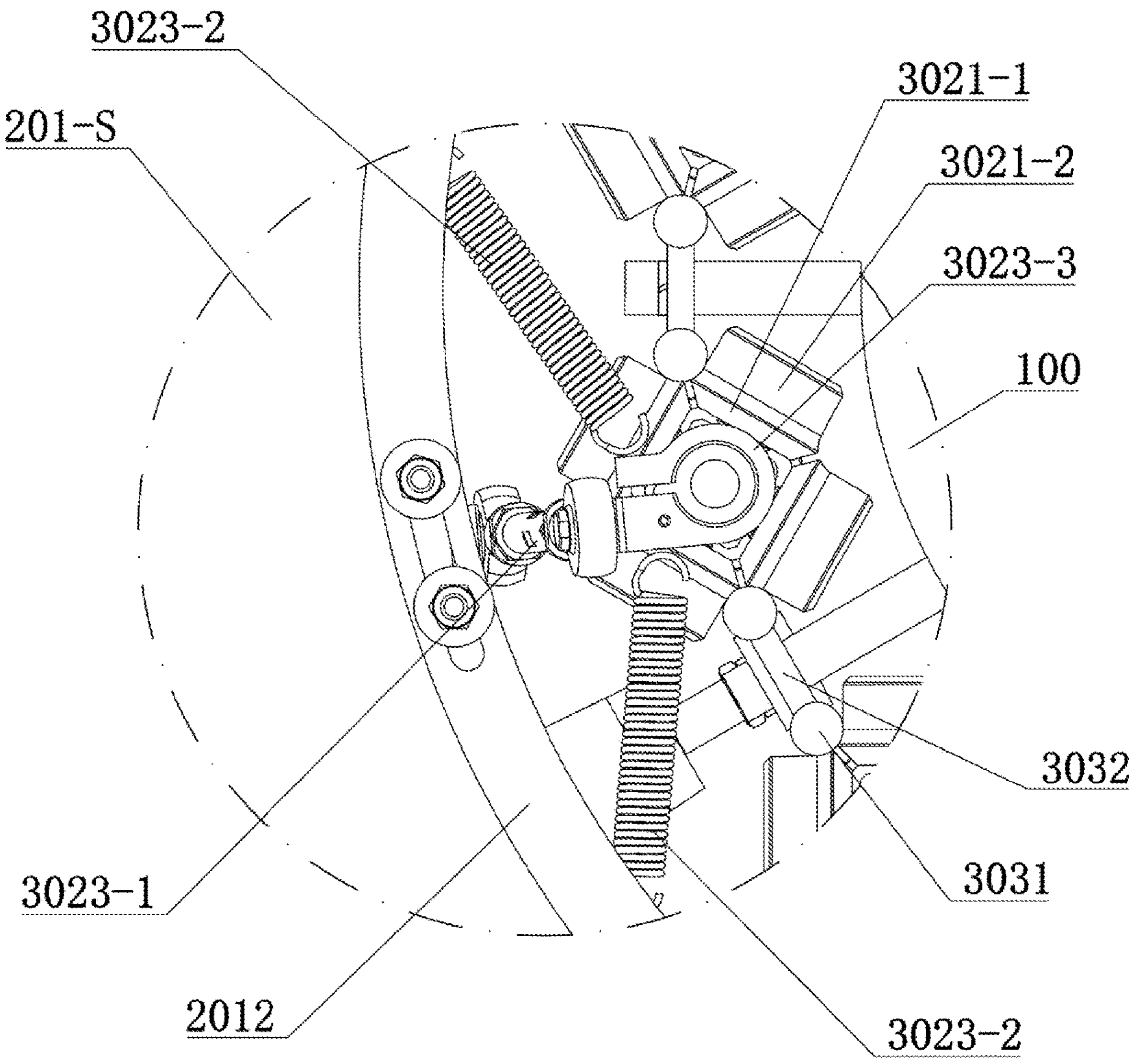
FIG. 5 is a partially-enlarged view of a region "A" in FIG. 4.
Figure 6:
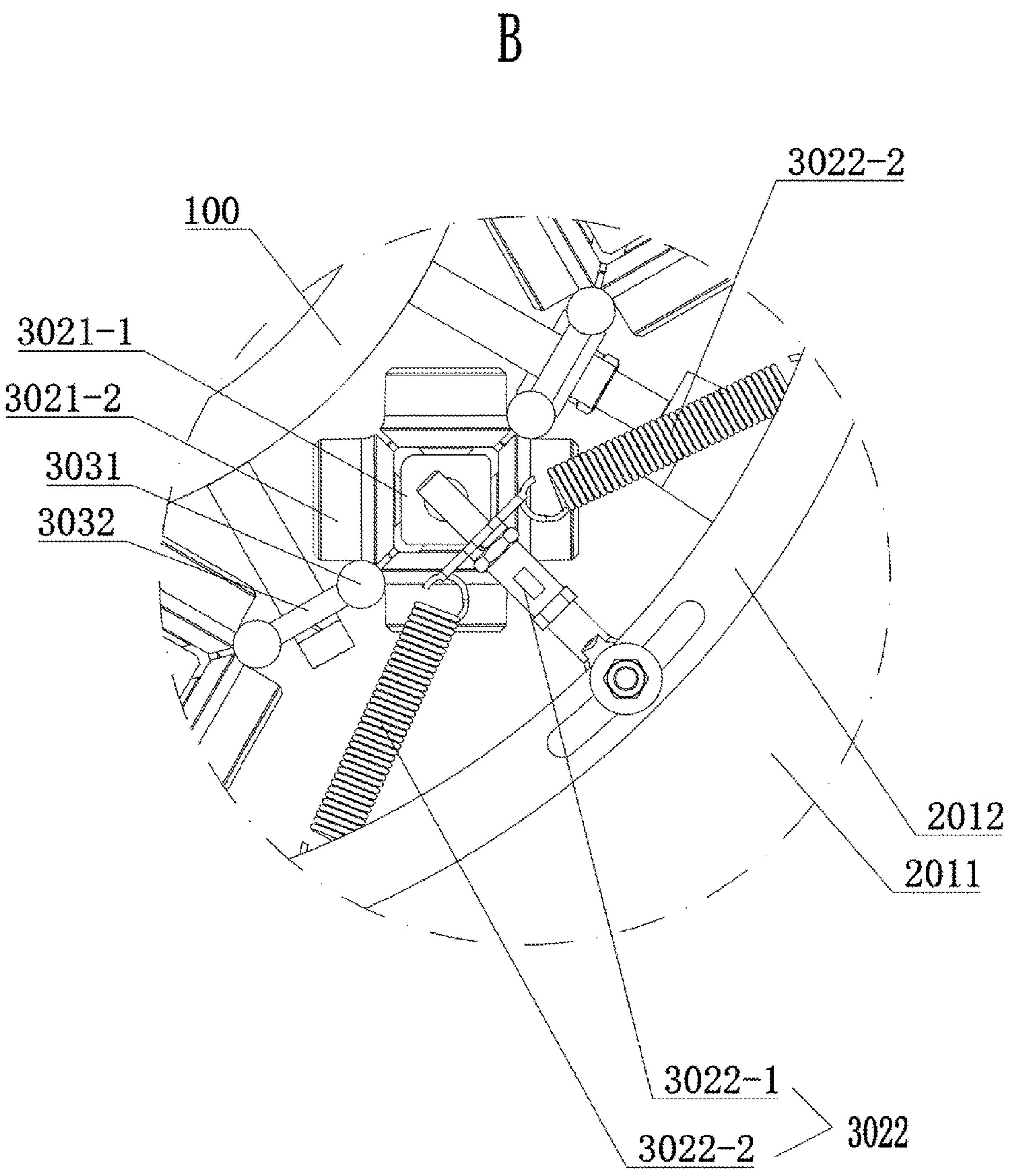
FIG. 6 is a partially-enlarged view of a region "B" in FIG. 4.
Figure 7:
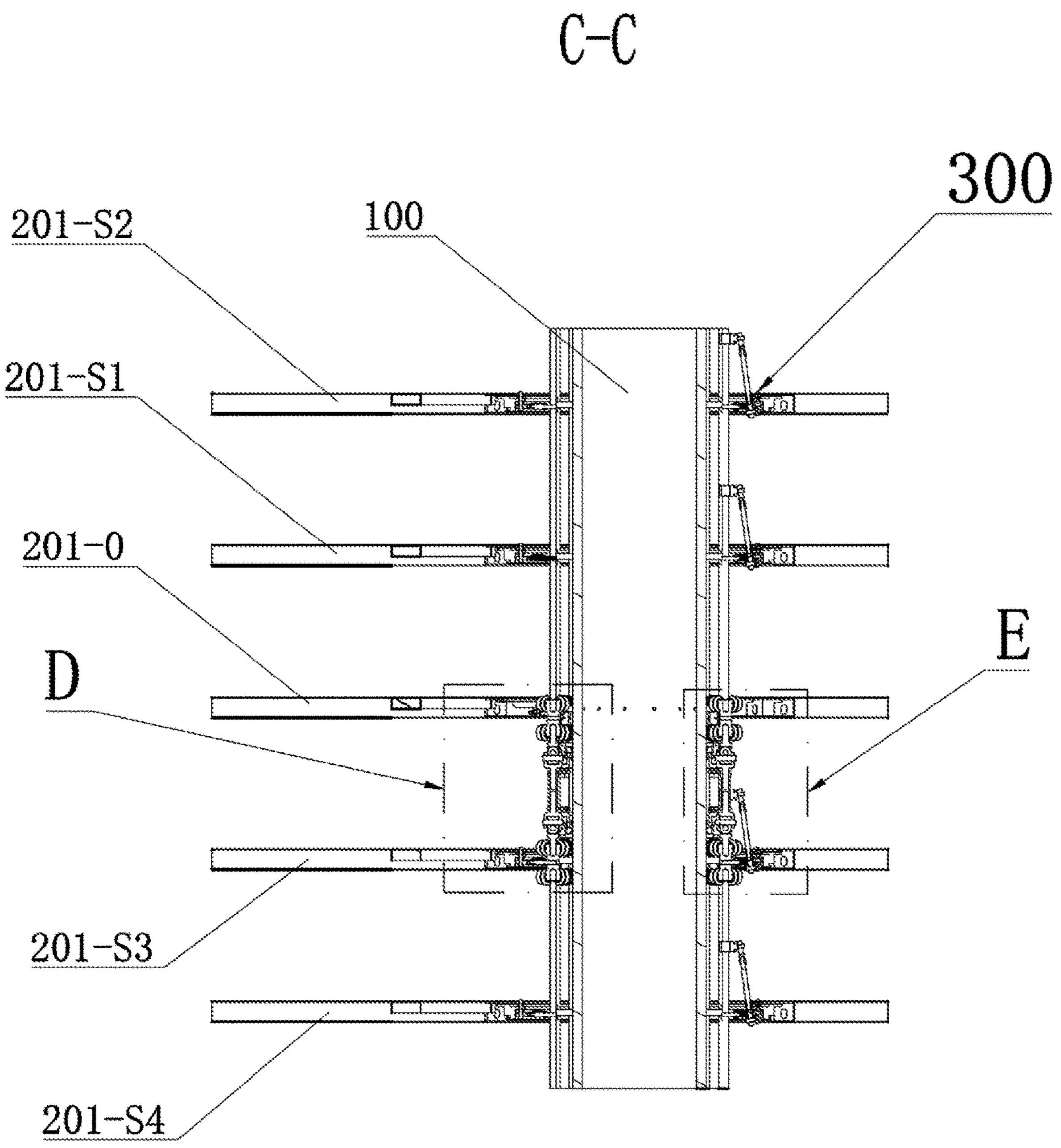
FIG. 7 is a sectional view taken along a direction of "C-C" in FIG. 4.
Figure 8:
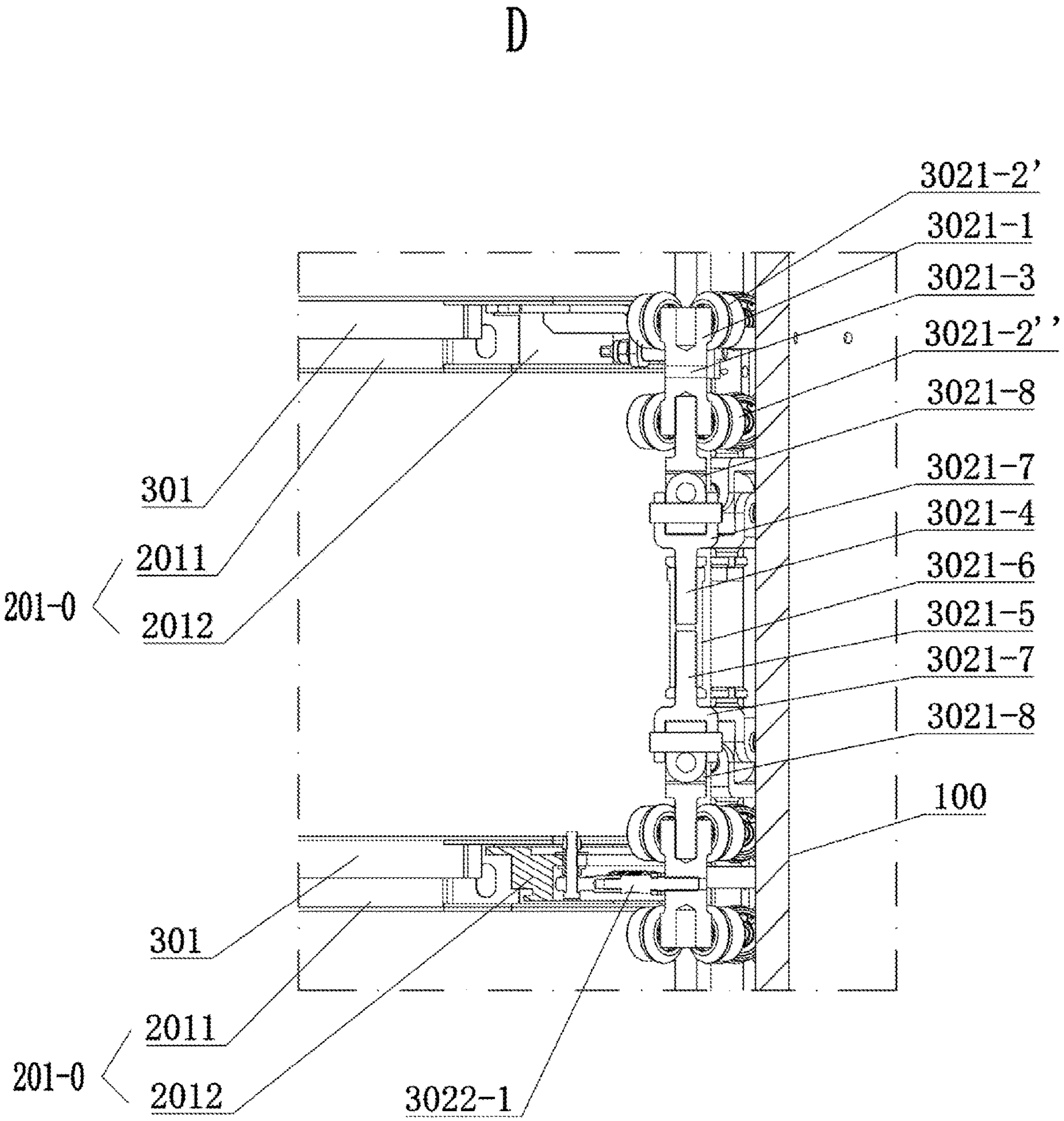
FIG. 8 is a partially-enlarged view of a region "D" in FIG. 7.
Figure 9:
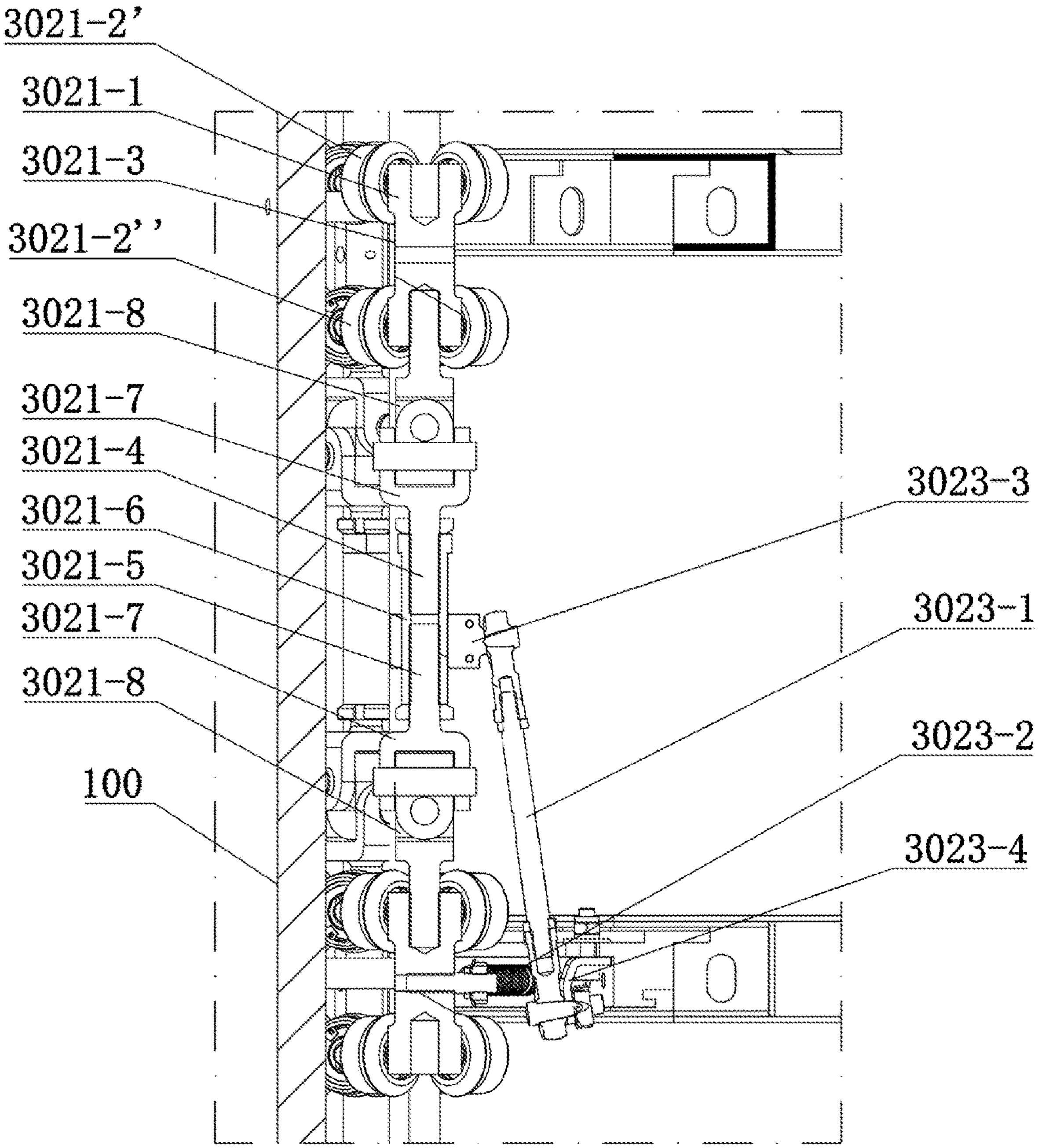
FIG. 9 is a partially-enlarged view of a region "E" in FIG. 7.
Figure 10:
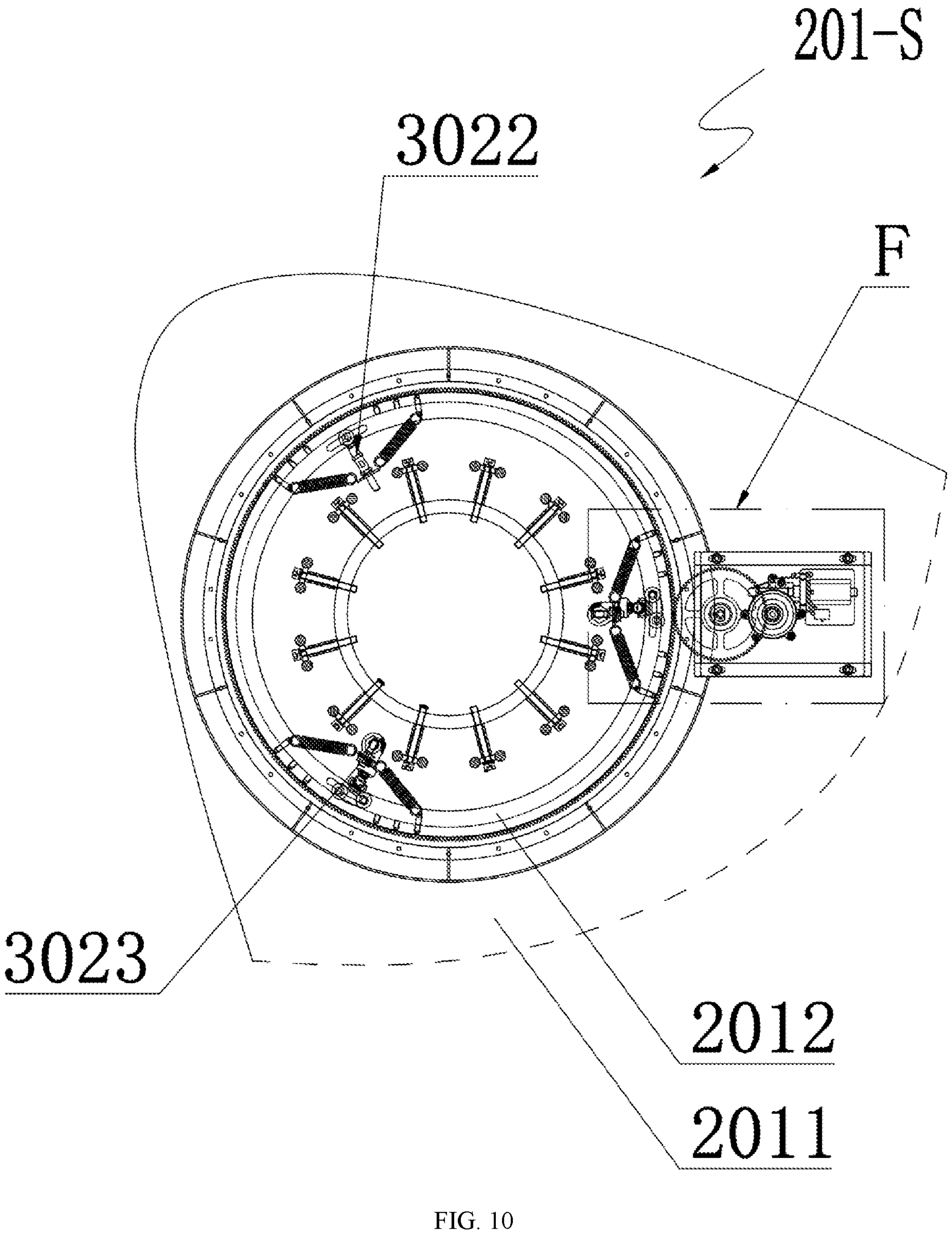
FIG. 10 is a schematic diagram illustrating a partial internal structure of a movable blade according to the present invention.

The basic structure in this embodiment is same as the above embodiment except that: as shown in FIG. 4, 3*q* traction chains 3021 are circumferentially disposed on the column 100, where q is an integer equal to or greater than 1. Movable blades 201-S with a same moving stroke and a same moving direction on the column 100 may be mounted on three same traction chains 3021. For example, 45 blades 201 are disposed on the bent column 100. All blades 201 are divided into nine blade groups, any blade group comprises one reference blade 201-0 at a middle position, two movable blades 201-S located above the reference blade 201-0 and two movable blades 201-S located below the reference blade 201-0. Further, when the blades 201 in the blade groups are gathered to present a flower shape, two movable blades 201-S that are comprised in four movable blades 201-S in a single blade group and located above the reference blade 201-0 move downwardly close to the reference blade 201-0, whereas two movable blades 201-S located below the reference blade 201-0 move upwardly close to the reference blade 201-0. In addition, the two movable blades 201-S located above the reference blade 201-0 have different moving strokes toward the reference blade 201-0, and similarly, the two movable blades 201-S located below the reference blade 201-0 also have different moving strokes toward the reference blade 201-0. Therefore, each of the four movable blades 201-S is connected with its respective traction chain 3021 through three connection points, and thus the four movable blades 201-S can complete axial movement through twelve traction chains 3021. Certainly, all movable blades 201-S in nine blade groups may be correspondingly connected onto their respective traction chains 3021, and all movable blades 201-S on the single column 100 can be pulled by twelve traction chains 3021 to enable nine blade groups to be separated to be in a mutually-paralleled initial state or to be gathered together to be in a nine-flower state.

Embodiment 12

The basic structure in this embodiment is same as that of Embodiment 11 except that: for example, five blades form one blade group, where a blade 201 at a middle position is the reference blade 201-0, and thus an upper second movable blade 201-S2, an upper first movable blade 201-S1, the reference blade 201-0, a lower first movable blade 201-S3 and a lower second movable blade 201-S4 are disposed in a sequence from top down. The upper first movable blade 201-S1 and the lower first movable blade 201-S3 are symmetrically designed about the reference blade 201-0, and the upper second movable blade 201-S2 and the lower second movable blade 201-S4 are also symmetrically designed about the reference blade 201-0. Therefore, moving paths in which the upper first movable blade 201-S1 and the lower first movable blade 201-S3 move toward the reference blade 201-0 at the middle position are same in length, and moving paths in which the upper second movable blade 201-S2 and the lower second movable blade 201-S4 move toward the reference blade 201-0 at the middle position are also same in length. As a result, moving paths of the traction chain 3021 driving the upper first movable blade 201-S1 to move and the traction chain 3021 driving the lower first movable blade 201-S3 to move are same in length, with a difference in that one traction chain 3021 moves downwardly and the other traction chain 3021 moves upwardly. Based on this requirement, in the present invention, one whole traction chain 3021 is formed by connecting upper ends of two traction chains 3021 corresponding to the upper first movable blade 201-S1 and the lower first movable blade 201-S3. The upper end of the traction chain 3021 changes direction through a fixed pulley 304 mounted at the top of the column 100, so that one section of the traction chain 3021 ascends, and the other section of the traction chain 3021 descends. Similarly, moving paths of the traction chain 3021 driving the upper second movable blade 201-S2 to move and the traction chain 3021 driving the lower second movable blade 201-S4 to move are also same in length. Based on this requirement, in the present invention, one whole traction chain 3021 is formed by connecting upper ends of two traction chains 3021 corresponding to the upper second movable blade 201-S2 and the lower second movable blade 201-S4. The upper end of the traction chain 3021 changes direction through a fixed pulley 304 mounted at the top of the column 100, so that one section of the traction chain 3021 ascends, and the other section of the traction chain 3021 descends. Therefore, one blade group including four movable blades 201-S and one reference blade 201-0 only needs two traction chains 3021 to drive the four movable blades 201-S up and down, thereby greatly reducing the number of drive components for driving the traction chains 3021 and simplifying the overall structure. Further, because one whole traction chain 3021 changes direction through the fixed pulley 304, an ascending distance and a descending distance of the traction chain 3021 are equal, thereby lowering the control difficulty.

Four movable blades 201-S are taken as an example. Three traction chains 3021 are required to fixedly mount each movable blade 201-S, so that a total of twelve traction chains 3021 are required. However, since one whole traction chain 3021 can be formed by connecting the ascending traction chain 3021 and the descending traction chain 3021, both of which have the same stroke, the twelve traction chains 3021 can be reduced to six traction chains 3021.

Further, preferably, when the upper ends of the two traction chains 3021 are connected so as to change direction through the fixed pulley, the lower ends of the above two traction chains 3021 may also be connected, so that the traction chains 3021 are formed into a head-tail-connected annular traction chain 3021. Six annular traction chains 3021 are correspondingly required for four movable blades 201-S in one blade group. 45 blades on the column 100 are divided into nine blade groups, and the blades in each blade group may be connected with their respective annular traction chains 3021 respectively. Although there are nine blade groups on the column 100, only six annular traction chains 3021 are required, thereby greatly reducing the number of traction chains 3021. Certainly, the number of movable blades 201-S in the blade group may be adjusted, or different movable blades 201-S in the blade group may have different moving path lengths, which will bring a corresponding change to the number of traction chains 3021 at this time. According to this change, the number of the corresponding traction chains 3021 may be calculated based on the number of movable blades 201-S in a single blade group, the number of stroke lengths of the movable blades 201-S, and whether the moving strokes of different movable blades 201-S among different blade groups are same. Therefore, the number of the above traction chains 3021 may be simply calculated based on actual requirements, which will not be enumerated herein.

Preferably, the above closed-loop traction chain 3021 in a position of the blades 201 needs to be pulled on the bent column by adopting a roller unit and a telescoping unit of the above traction chain 3021. However, it should be understood that the whole closed-loop traction chain 3021 is composed of units including but not limited to the roller unit and the telescoping unit. When there is no guide requirement for part of the traction chain, a conventional chain 3030 may be adopted for connection in consideration of cost and connection strength, thereby reducing the number of roller units and telescoping units. Therefore, the whole traction chain 3021 should be understood as formed by connecting heads and tails of a plurality of sections, where one or more sections of the traction chain 3021 may be formed by adopting the above structure in which the roller unit and the telescoping unit are disposed alternately, and the remaining sections may be a conventional chain 3030.

Embodiment 13

Figure 22:
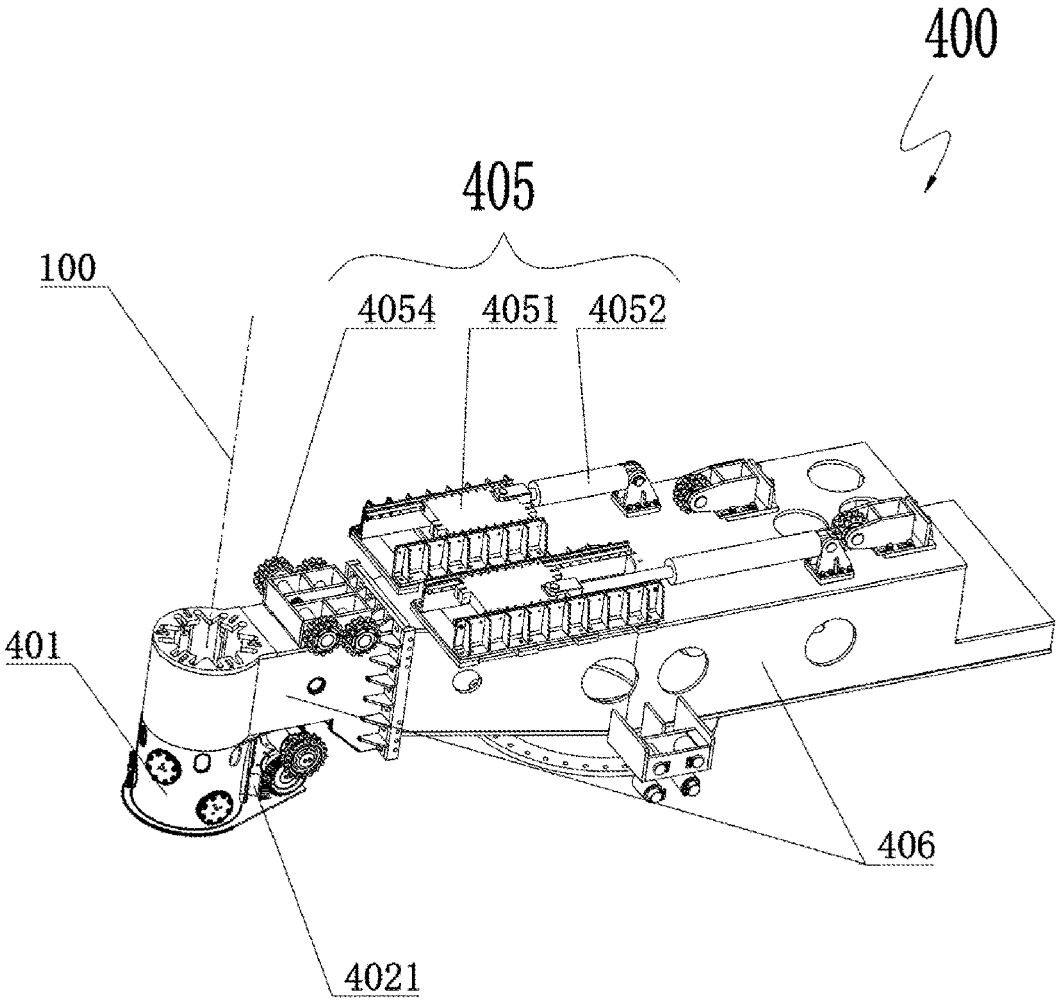
FIG. 22 is a structural schematic diagram illustrating a bearing unit according to the present invention.
Figure 23:
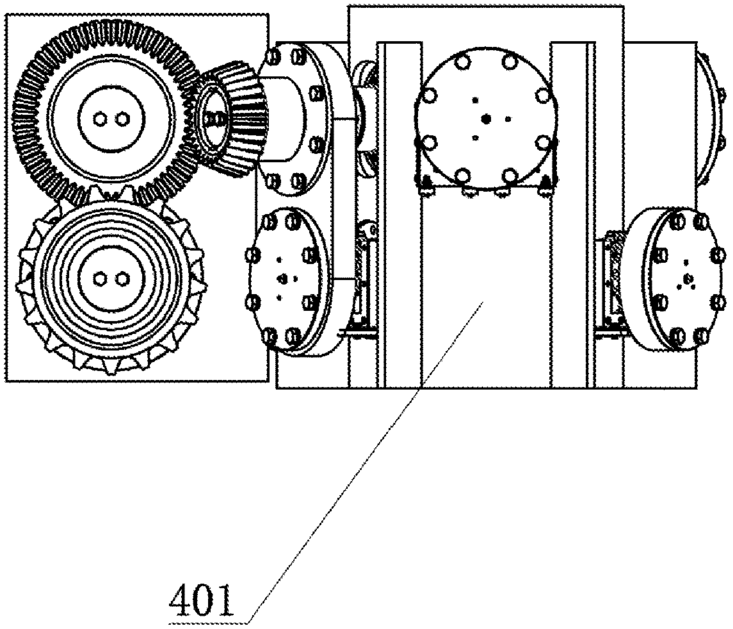
FIG. 23 is a structural schematic diagram illustrating a drive box in FIG. 22.
Figure 24:
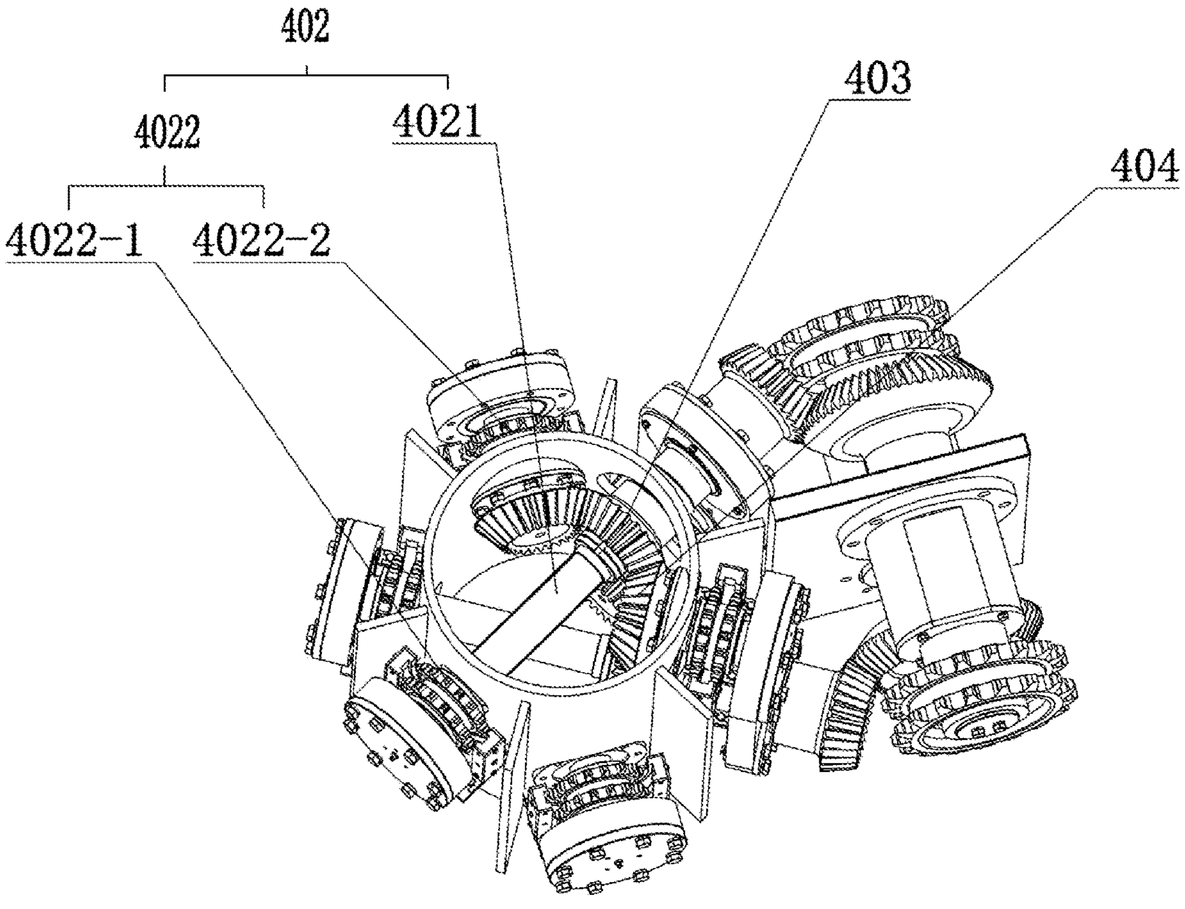
FIG. 24 is an internal structural schematic diagram illustrating a drive box in FIG. 22.
Figure 25:
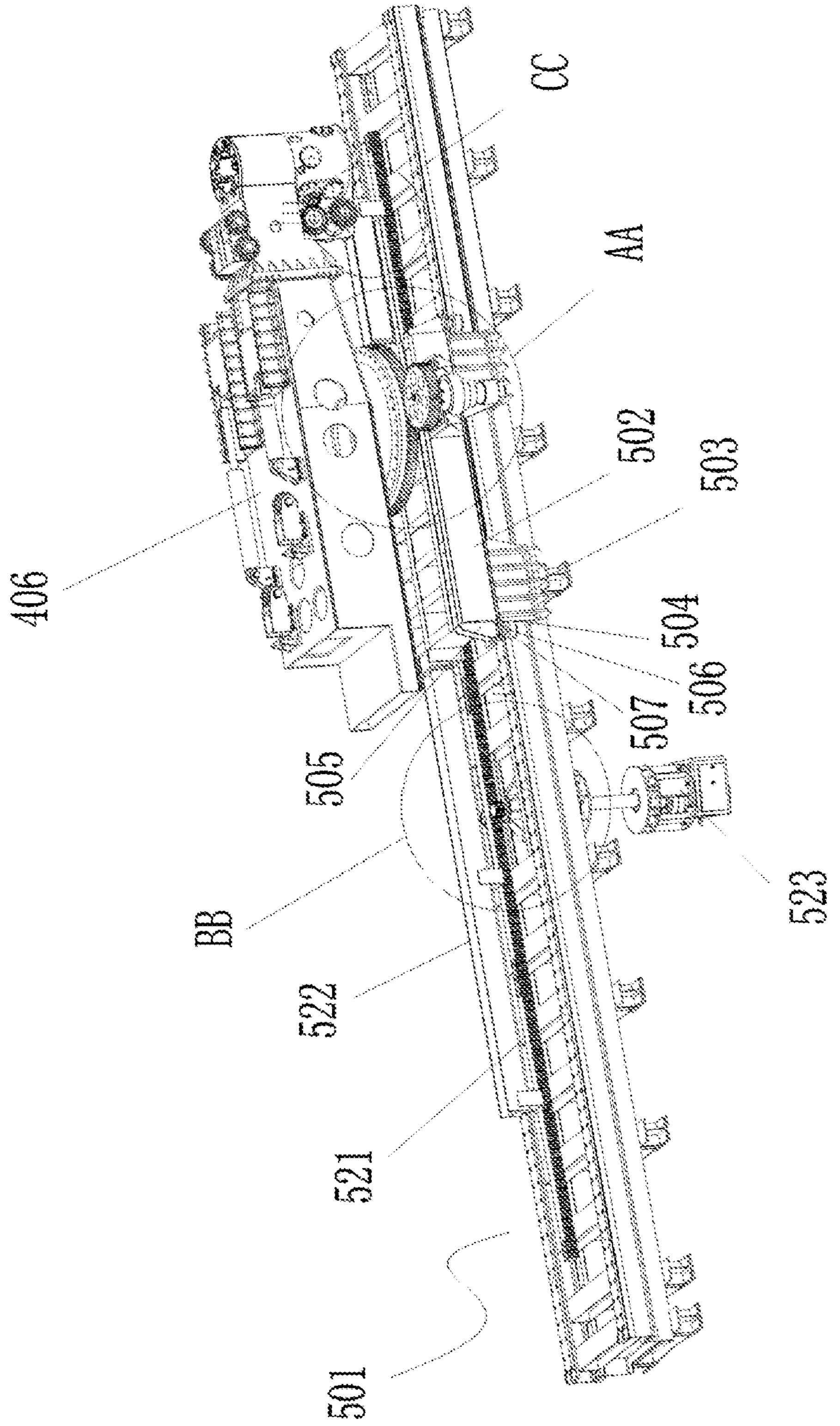
FIG. 25 is a schematic diagram illustrating a stereoscopic structure of a movable base according to the present invention.
Figure 26:
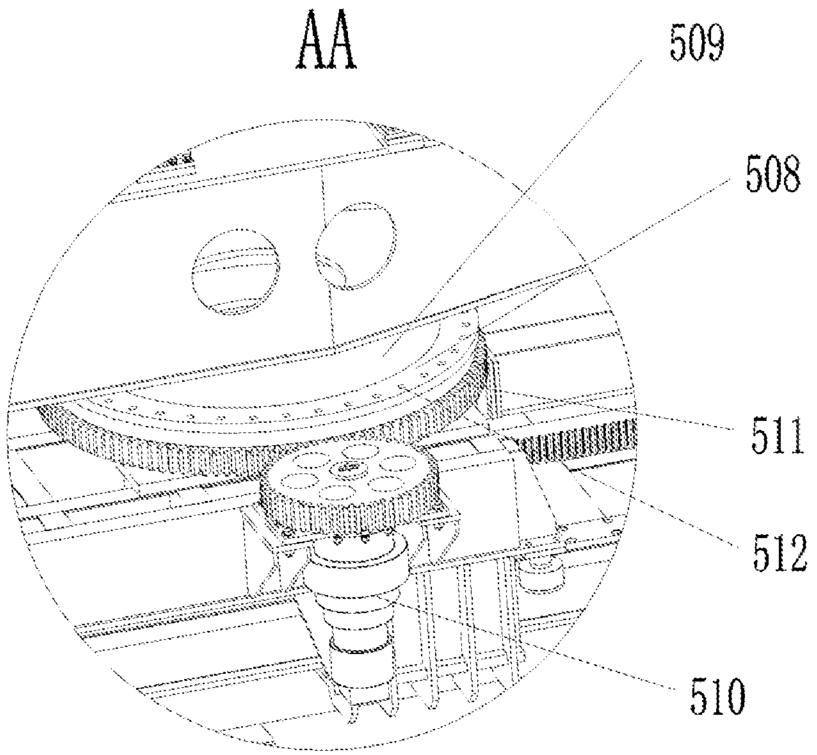
FIG. 26 is a partially-enlarged view of a region “AA” in FIG. 25.
Figure 27:
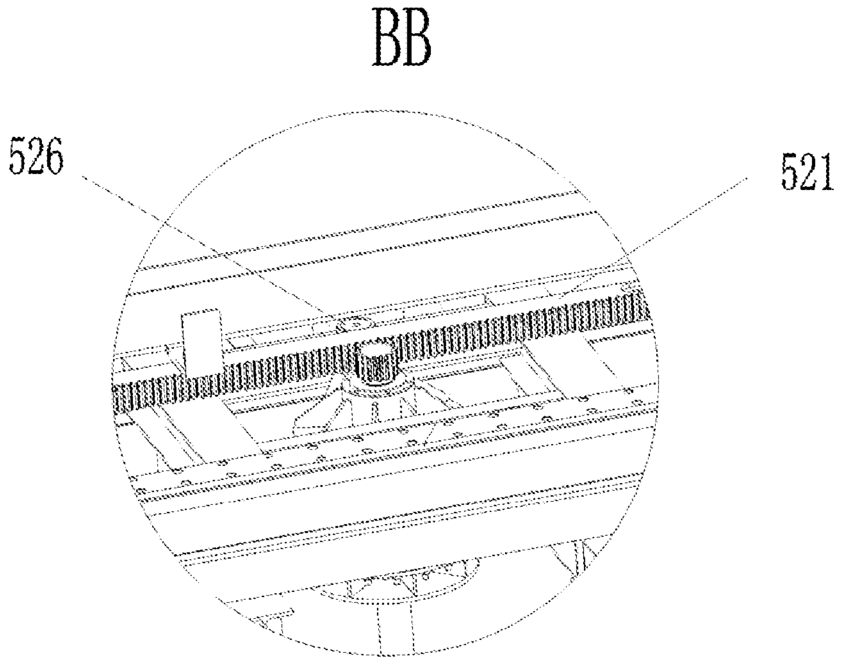
FIG. 27 is a partially-enlarged view of a region “BB” in FIG. 25.
Figure 28:
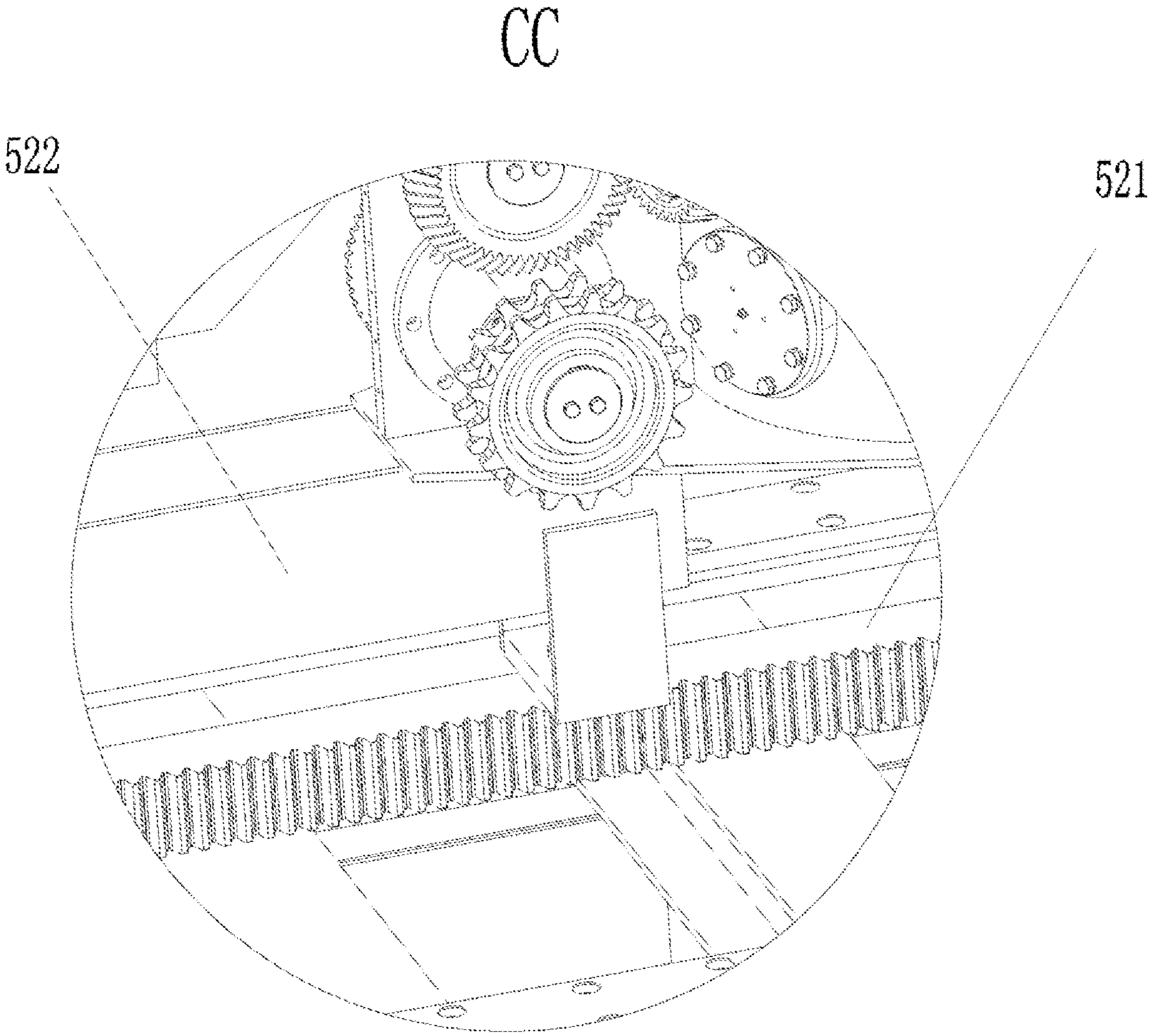
FIG. 28 is a partially-enlarged view of a region “CC” in FIG. 25.
Figure 29:
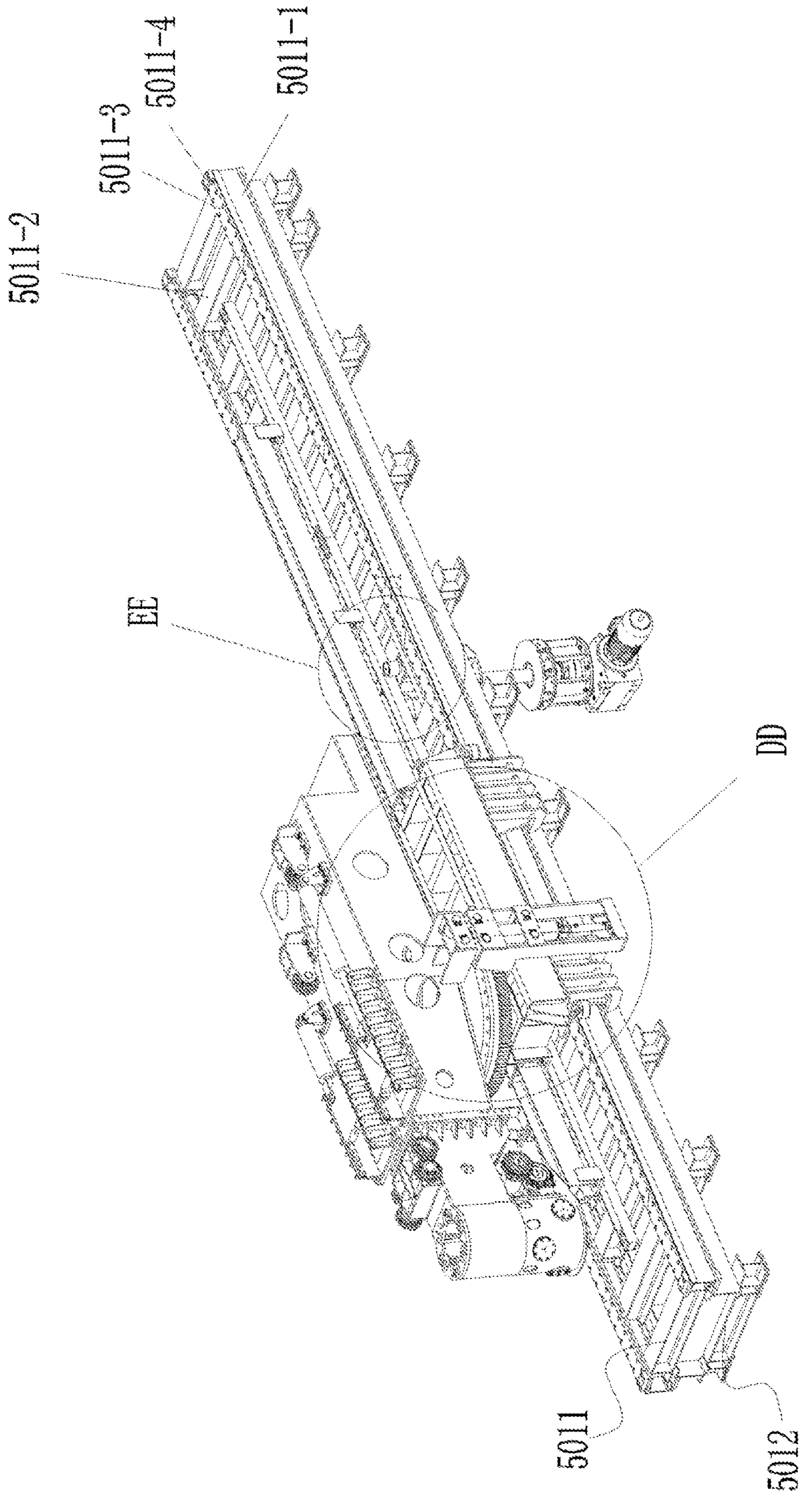
FIG. 29 is a schematic diagram illustrating a stereoscopic structure of a movable base at another angle according to the present invention.
Figure 30:
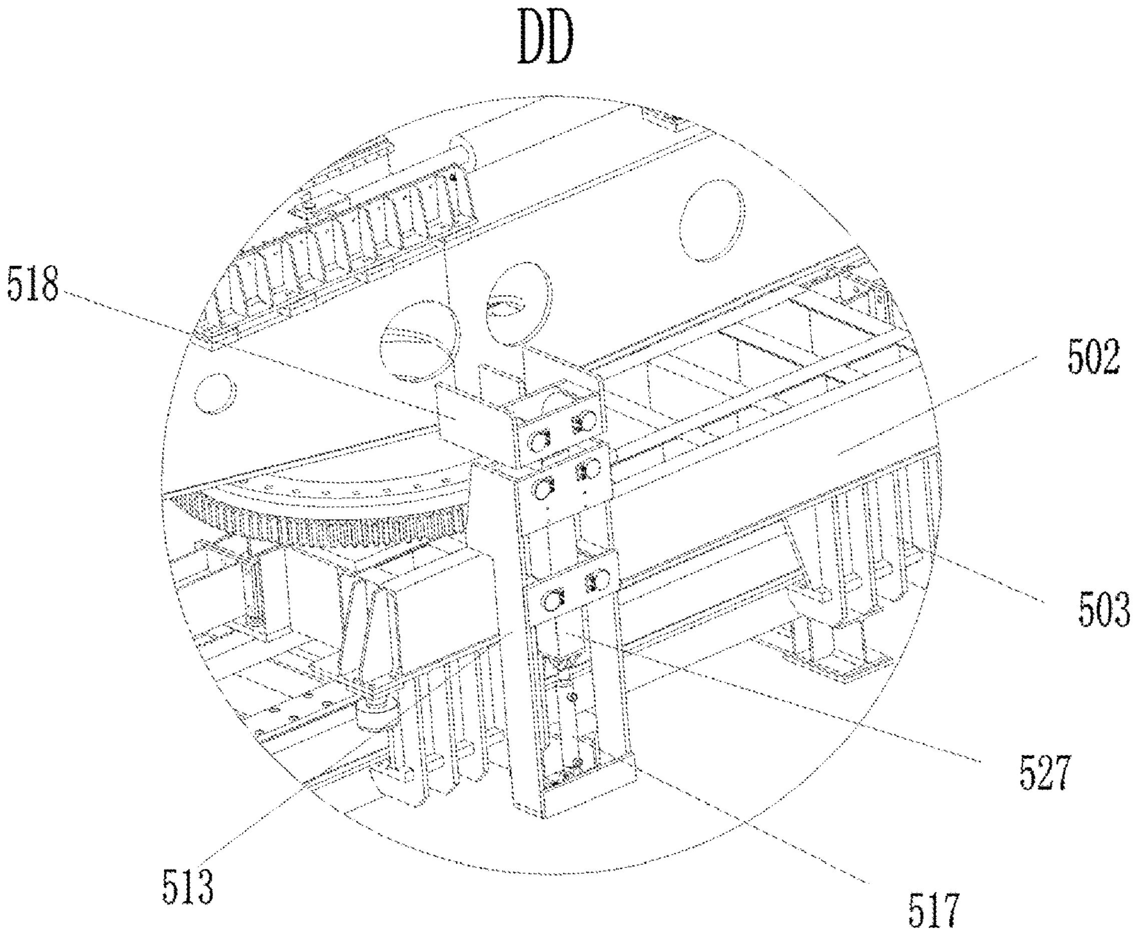
FIG. 30 is a partially-enlarged view of a region “DD” in FIG. 29.
Figure 31:
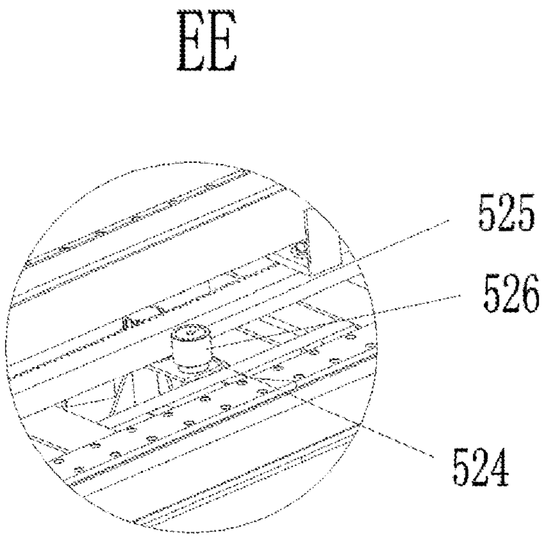
FIG. 31 is a partially-enlarged view of a region “EE” in FIG. 29.
Figure 32:
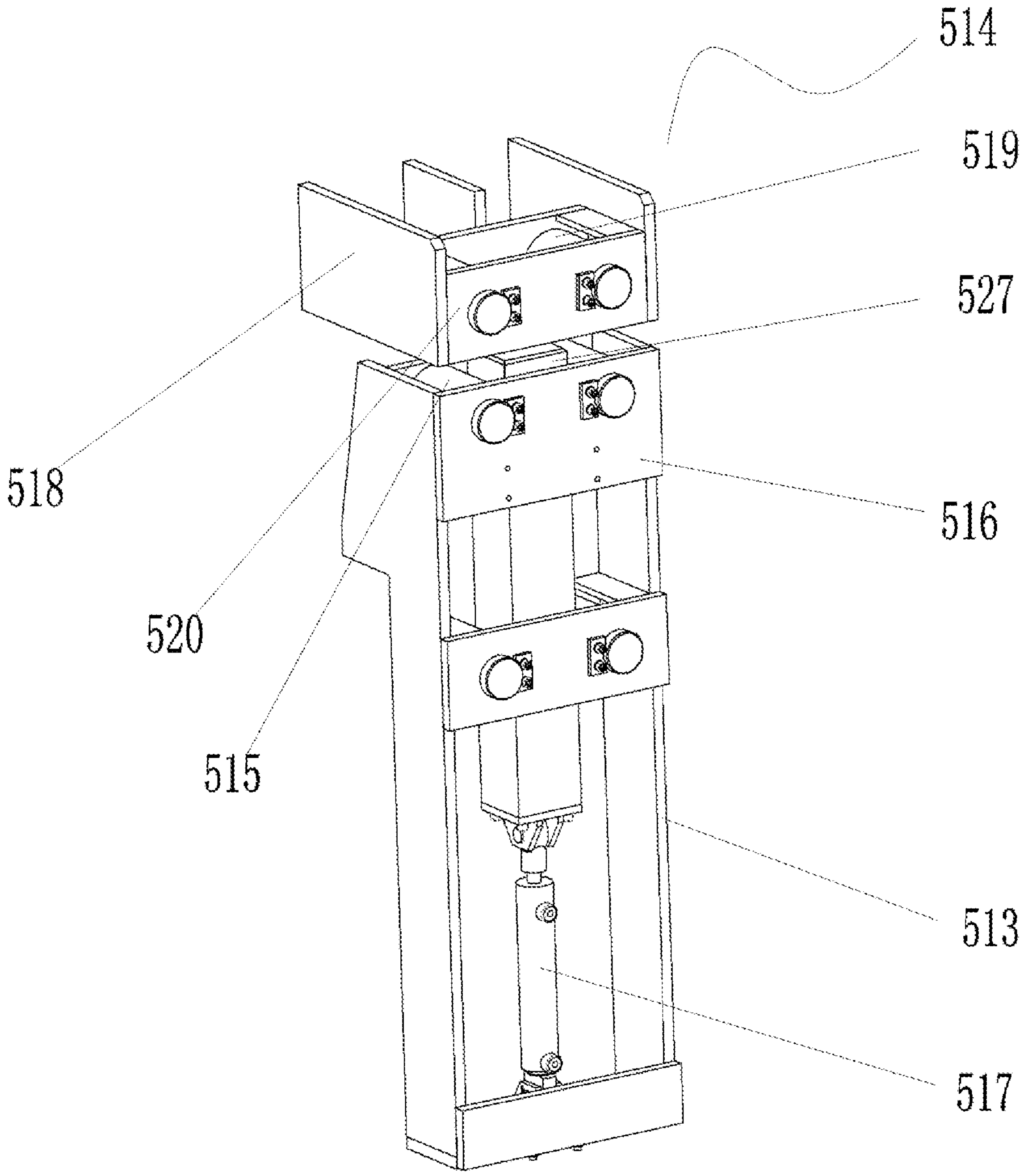
FIG. 32 is a schematic diagram illustrating a stereoscopic structure of a locking mechanism of a movable base according to the present invention.

As shown in FIGS. 22-24, the bearing unit 400 comprises a bearing seat 406. The column 1 is vertically fixed on the bearing seat 406, and a traction chain drive device for driving the traction chain 3021 is disposed on the bearing seat 406. Specifically, the traction chain drive device comprises a drive box 401, a traction chain drive assembly 402 and a traction chain power assembly 405. The drive box 401 is disposed below a lower end of the column 1, at least two traction chain drive assemblies 402 are disposed in the drive box 401 along the axial direction of the column 1, each of the traction chain drive assemblies 402 comprises a drive shaft 4021 and a driven member 4022 in transmission connection with the drive shaft 4021. The driven member 4022 is also in transmission connection with the annular traction chain 3021. The above at least two traction chain drive assemblies 402 are disposed along the axial direction of the column 100 to form a plurality of structures without mutual interference. In this way, an axial space is fully utilized without occupying an outer surface space of the column 100, and different chain transmissions are realized through different drive shafts 4021. Thus, a plurality of traction chains can be driven while a small entire volume is guaranteed. Since a portion of the traction chain 3021 on the bearing unit 400 is formed by a conventional chain 3030, the driven member 4022 may be a sprocket wheel to realize transmission connection with the chain 3030.

As shown in FIG. 24, a projection position of each of the drive shafts 4021 along the axial direction of the column 100 and a projection position of the adjacent drive shaft 4021 along the axial direction of the column 100 are staggered. The staggering can ensure non-overlapping of the drive shafts 4021 and drive the traction chains 3021 at different positions more closely, leading to a more reasonable arrangement. The projection positions of the driven members 4022 along the axial direction of the column 100 are set along the circumferential direction of the column 100 to achieve reasonable arrangement. In this way, the traction chains 3021 at different positions on the column 100 can be driven, especially when the traction chains 3021 are uniformly arranged along the circumferential direction.

As shown in FIG. 24, the driven members 4022 in the traction chain drive assembly 402 are uniformly disposed along the circumferential direction of the column 100, so that the traction chains 3021 at different positions on the column 100 can be driven especially when the traction chains 3021 are uniformly arranged along the circumferential direction. Further, a plurality of traction chain drive assemblies 402 may be combined to form a structure circumferentially and uniformly arranged on the projection. For example, there are three driven members 4022 in each traction chain drive assembly 402, that is, the driven members 4022 in each traction chain drive assembly 402 are all arranged at an interval of 120 degrees. Another traction chain drive assembly 402 is rotated 60 degrees relative to the above traction chain drive assembly and thus, a structure in which the driven members 4022 are circumferentially and uniformly arranged at an interval of 60 degrees is formed on the projection, that is, a plurality of structures circumferentially and uniformly arranged are formed by using the axial space. Therefore, a problem that it is difficult to dispose a plurality of drive structures on the column 100 can be solved and each drive structure can be individually controlled, leading to a higher level of safety and intelligence.

The transmission connection between the driven member 4022 and the drive shaft 4021 refers to that the driven member 4022 is sleeved on the drive shaft 4021, or the drive shaft 4021 is transmission-connected with the driven member 4022 by a gear. The above connection structures both can realize transmission through one drive shaft 4021.

As shown in FIG. 24, the driven member 4022 comprises a first driven member 4022-1 and a second driven member 4022-2. The first driven member 4022-1 is sleeved at a free end of the drive shaft 4021, a driving bevel gear 403 is disposed on the drive shaft 4021, a driven bevel gear 404 is disposed on the second driven member 4022-2, and the driven bevel gear 404 is engaged with the driving bevel gear 403 or engaged with an adjacent driven bevel gear 404. That is, the first driven member 4022-1 and the second driven member 4022-2 at different positions are driven in many manners to achieve more reasonable arrangement and utilize a transverse space of the drive box 401 more fully. The driven bevel gear 404 is engaged with the driving bevel gear 403 or engaged with the adjacent driven bevel gear 404 to perform stable drive and direction change, thereby ensuring multi-directional drive.

The traction chain power assembly 405 for driving the drive shaft 4021 to rotate is also disposed on the bearing seat 406. The traction chain power assembly 405 comprises a slide block 4051 and a hydraulic component 4052 driving the slide block 4051 to slide. The slide block 4051 is transmission-connected with the drive shaft 4021 through a transmission chain 63. The hydraulic component 4052 is mounted on the bearing seat 406. A transmission sprocket wheel 4054 engaged with the transmission chain 63 is also disposed on the bearing seat 406, and may be driven by a motor or a hydraulic motor. Correspondingly, since the traction chains 3021 on the column bear a heavy mechanism, the hydraulic component 4052 may be used to drive the slide block 4051 to slide, and the transmission chain 63 connected on the slide block 4051 is driven to bring the drive shaft 4021 to rotate. Thus, the hydraulic component 4052 moves reciprocally to drive the drive shaft 4021 to move reciprocally, so as to realize forward and reverse operation of the traction chain 3021.

Embodiment 14

Based on Embodiment 13, the present invention provides a control method of driving a traction chain, comprising the following steps.

At step 1, the hydraulic component 4052 is operated, and a pull force between the slide block 4051 and the transmission chain 63 is detected; when the pull force between the slide block 4051 and the transmission chain 63 is greater than a preset value, step 2 is performed.

At step 2, the hydraulic component 4052 stops operation and pictures of the driving bevel gear 403 and the driven bevel gear 404 are taken, and then, step 3 is performed.

At step 3, whether there is foreign matter between the driving bevel gear 403 and the driven bevel gear 404 is determined; if yes, step 4 is performed; otherwise, step 1 is performed.

At step 4, the hydraulic component 4052 is operated reversely, and the pull force between the slide block 4051 and the transmission chain 63 is detected; when the pull force between the slide block 4051 and the transmission chain 63 is greater than a first preset value, step 6 is performed; when the pull force between the slide block 4051 and the transmission chain 63 is less than the preset vale, steps 5 is performed.

At step 5, a time of reverse operation of the hydraulic component 4052 is recorded; when the time of reverse operation is greater than a preset time, step 2 is performed.

At step 6, the hydraulic component 4052 stops operation and a call is made for maintenance.

By detecting the pull force between the slide block 4051 and the transmission chain 63, smart determination can be made on normal operation, thereby ensuring overall safety and greatly improving the safety level. Furthermore, whether there is foreign matter can be determined more intelligently by taking the pictures of the driving bevel gear 403 and the driven bevel gear 404. Furthermore, the foreign matter can be rotated out through reverse operation to avoid jamming and repairs. Finally, whether there is still any foreign matter is determined. This way ensures the overall safety and realizes an intelligent and efficient determination process. Therefore, the above method is an intelligent and safe inspection and control method for a stage mechanism.

Embodiment 15

As shown in FIGS. 25 to 32, in order to enable the kinetic sculpture to realize gathering or separation of blades on each column, it is required for the columns 100 to move mutually. For this purpose, this embodiment is provided, comprising a plurality of movable bases 500. The plurality of movable bases 500 are arranged radially and equidistantly along a circumferential direction around a centerline disposed vertically. A bearing unit 400 is mounted on each of the movable bases 500, a vertical column 100 is mounted on the bearing unit 400, and a blade unit 200 is disposed on the column. The bearing units 400 move the columns along respective moving paths on the respective movable bases toward the position of the centerline or away from the position of the centerline to achieve gathering or separation. The above centerline refers to a direction of gravity of an entire sculpture formed by gathering various components of the kinetic sculpture, i.e. a reference line in a vertical direction. The reference line is a reference position by which various components of the kinetic sculpture are assembled as well as a vertical reference line predesigned by engineering personnel. The above moving path is the movable base 500 laid based on the centerline and a specific travel route along which the bearing unit on the movable base 500 is moved toward the position of the centerline under the drive of the power component of the movable base 500, where the route may be a straight line or a curved line. After the position of the centerline is determined, based on the structural design of the movable base 500, the bearing unit 400 on the movable base 500 can move toward or away from the position of the centerline along a predetermined route.

The bearing unit 400 as mentioned in the embodiment 13 comprises a bearing seat 406 which is a hollow structure. An end of the bearing seat 406 is provided an extension end for mounting the column 100. The drive box 401 is disposed under the extension end of the bearing seat 406. The traction chain drive assembly 402 is mounted inside the drive box 401, and the traction chain power assembly 405 is disposed on the bearing seat 406. The traction chains on the column 100 are driven to move by the traction chain power assembly 405 and the traction chain drive assembly 402, so as to achieve movement of the blade unit on the column 100.

Preferably, the movable base 500 comprises a track 501 and a base drive assembly.

The track 501 comprises a slide rail portion 5011 and a support portion 5012. The support portion 5012 is mounted at the lower side of the slide rail portion 5011 to support the slide rail portion 5011. The slide rail portion 5011 comprises two mutually-paralleled slide bars 5011-1 which are fixedly connected by a plurality of track connection pieces 5011-2. A slide plate 5011-3 is disposed on the upper side and the lower side of the slide rail bar 5011-1 respectively. The slide plate 5011-3 has a smooth surface with low friction. A limiting block 5011-4 is disposed on both ends of the slide plate 5011-3 respectively to limit the bearing seat 406, thus preventing the bearing seat 406 from sliding out of the slide rail bars.

A translation assembly is silidably disposed on the track 501, a rotary assembly is disposed on the translation assembly and the bearing seat 406 is disposed on the rotary assembly. The translation assembly can be driven to slide on the track back and forth. In this embodiment, the rotary assembly is mounted on the translation assembly on the movable base 500 and the bearing seat 406 is mounted on the rotary assembly. In this way, under the drive of the translation assembly and the rotary assembly, the bearing seat 406 can complete both translation and rotation, such that the column on the bearing seat 406 can complete corresponding translation and rotation, increasing the dynamic effect and visual effect.

The translation assembly comprises a slide seat 502 and both sides of the slide seat 502 is disposed on the slide plates 5011-3 of the two slide rail bars 5011-1. An L-shaped limiting piece 503 is disposed on both sides of the slide seat 502 and a slide groove 504 is formed between the slide seat 502 and the limiting piece 503. The slide rail bar 5011-1 is embedded in the slide groove 504 and an upper surface of a transverse plate of the liming piece 503 is in contact with the slide plate 5011-3 at the lower side of the slide rail bar 5011-1. A plurality of first roller assemblies are further disposed on the slide seat 502, that is, one first roller assembly is mounted at an outer side of each limiting piece 503. The first roller assembly comprises a first fixing plate 505, a first rotary shaft 506 and a first roller 507. The first fixing plate 505 is fixed on the slide seat 502, the first rotary shaft 506 is fixed on the first fixing plate 505, and the first roller 507 is axially limited and circumferentially rotatably connected to the first rotary shaft 506. The first roller 507 is in contact with a sidewall of the slide rail bar 5011-1. When the slide seat 502 slides on the track 501, the first roller 507 rolls on the sidewall of the slide rail bar 5011-1. With this structure, the first roller of the first roller assembly can reduce friction between the slide seat and the track so as to slide the slide seat more smoothly on the track.

The rotary assembly comprises a turntable 508, a bearing ring 509, a fixing shaft and a first driver 510. A gear ring 511 is disposed on an outer circumferential wall of the turntable 508. A plurality of fixing holes 512 are disposed on an inner side of the turntable 508. The turntable 508 is sleeved on the bearing ring 509, and a radial fixing ring (not shown) is disposed on an outer wall of the bearing ring 509. The inner side of the turntable 508 is fixedly connected with the radial fixing ring through bolts. Thus, the turntable 508 can drive the bearing ring 509 to rotate when rotating. The fixing shaft is fixedly mounted on the slide seat 502 and the bearing ring 509 is axially limited and circumferentially rotatably sleeved on the fixing shaft. A middle portion of the bearing seat 406 is fixedly mounted on an upper end of the bearing ring 509. The first driver 510 is a motor, and an output end of the motor is provided with a gear engaged with the gear ring 511. When the motor starts, the output shaft of the motor rotates the gear to drive the turntable 508, the bearing ring 509 and the bearing seat 506 to rotate. In this structure, a gear ring is disposed on the outer circumferential wall of the turntable and thus the motor can drive the gear to rotate so as to drive the turntable to rotate, achieving simple structure and accurate control.

A locking mechanism is disposed between the bearing seat 406 and the slide seat 502. The locking mechanism comprises a locking body 513 and a locking buckle 514. The locking body 513 is a hollow structure. A plurality of first roller groups are disposed in the locking body 513. The first roller group comprises two first rolling wheels 515 paralleled to each other. Two opposed first support plates 516 are disposed at the positions corresponding to the first roller group on the locking body 513. Both ends of central shafts of the first rolling wheels 515 are fixedly connected to the first support plates 516 at both sides respectively. A space for mounting a locking tongue is reserved between the two first rolling wheels 515. In a specific embodiment, two first roller groups are disposed, which are arranged up and down on the locking body 513. The locking tongue 527 is mounted between two first rolling wheels 515 of the first roller group. The first rolling wheel 515 is in contact with an outer sidewall of the locking tongue 527. During an up and down slide of the locking tongue 527, the first rolling wheel 515 rolls on the outer sidewall of the locking tongue 527. A second driver 517 is disposed at a lower side of the locking tongue in the locking body 513. In a specific embodiment, the second driver 517 may be a hydraulic cylinder, and an end of a piston of the hydraulic cylinder is connected with the locking tongue 527. The piston is used to drive the locking tongue 527 to move up and down. In this structure, under the action of the first roller groups, the locking tongue can move up and down with low friction in the locking body.

The locking buckle 514 comprises a support frame 518. At least one second roller group is disposed inside the support frame 518. The second roller group comprises two second rolling wheels 519 paralleled to each other. Two opposed second support plates 520 are disposed at the positions corresponding to the second roller group on the locking buckle 514, and both ends of central shafts of the second rolling wheels 519 are fixedly connected respectively to the second support plates 520 at both sides. A space for the locking tongue to be inserted in is reserved between the two second rolling wheels 519. When the locking tongue 527 is inserted into the space, the second rolling wheels 519 are in contact with the surface of the locking tongue 527. When the bearing seat 406 rotates to a preset position, the locking tongue 527 moves upwardly to be between the two second rolling wheels 519, so as to lock up the bearing seat 406. The locking tongue 527 moves downwardly to exit from between the two second rolling wheels 519 so as to unlock the bearing seat 406. In this structure, under the action of the second rolling wheels, the locking tongue can be inserted into the locking buckle with low friction.

The base drive assembly comprises a rack and a third driver 523. The rack is formed by splicing several rack split bodies 521. Each rack split body 521 comprises a strip-shaped rack body. A plurality of teeth are disposed on a side of the rack body along a length direction of the rack body. After several racks are spliced together, the teeth on the rack body face toward a same side. Part of the rack bodies is fixedly connected under the slide seat 502 and above the track connection piece 5011-2 of the track 501. An extension support 522 is disposed at both ends of the slide seat 502 respectively, and part of the rack bodies is fixedly connected under the extension support 522 and above the track connection piece 5011-2 of the track 501. The third driver 523 is a motor. An output end of the motor is connected with a gear. The output end of the motor protrudes to between the track connection pieces 5011-2 of the track 501 and close to the toothed side of the rack. The gear is engaged with the rack. An upper surface of the gear is lower than an upper surface of the rack, such that the gear will not interfere with the slide of the slide seat 502. A second roller assembly is mounted on the track 501. The second roller assembly comprises a second fixing plate 524, a second rotary shaft 525 and a second roller 526. The second fixing plate 524 is fixed on the track connection piece 5011-2 of the track 501, the second rotary shaft 525 is fixed on the second fixing plate 524, and the second roller 526 is axially limited and circumferentially rotatably connected to the second rotary shaft 525. The second roller is in contact with the un-toothed side of the rack. When the rack runs, the second roller 526 rolls on the sidewall of the rack.

In this embodiment, since the rotary assembly is disposed on the translation assembly of the movable base of the kinetic sculpture and the bearing seat is disposed on the rotary assembly, the bearing seat 406 can, under the drive of the translation assembly and the rotary assembly, complete both translation and rotation, such that the column 100 mounted on the bearing seat 406 can complete corresponding translation and rotation, increasing the dynamic effect and visual effect.

Embodiment 16

Based on the structure of the above embodiments, the present invention provides an intelligent control system for a kinetic sculpture, comprising a plurality of movable bases arranged radially along a circumferential direction around a centerline disposed vertically. A bearing unit is mounted on each of the movable bases, a vertical column is mounted on the bearing unit, and a blade unit is disposed on the column. The bearing units move the columns along respective moving paths on the respective movable bases toward the position of the centerline or away from the position of the centerline to achieve gathering or separation. The intelligent control system comprises the following steps.

At step Z1, each column is correspondingly provided with one column system; the column system of each column runs back and forth at a preset speed for one cycle and turns on a corresponding lighting system; in the running cycle, a difference between a real time running speed of the column system and the predetermined speed is detected and a minimum value of the differences is selected and set to r1, and the column system is set as a target column; when the absolute value of r1 is greater than a preset value, Z2 is performed.

At step Z2, a real time position of the target column is obtained; when the real time position of the target column is greater than a preset position, Z3 is performed; when the real time position of the target column is less than or equal to the preset position, Z4 is performed. The above position is a spatial coordinate position set by human.

At step Z3, the preset speeds of the column systems other than the target column are corrected based on the real time running speed of the target column to maintain consistency and S1 is performed.

At step Z4, the target column stops and records a running time t1 before stop, and turns off the lighting system corresponding to the column system, and also records, in real time, a real-time remaining time t2 in the cycle except for the target column system; when the remaining time t2 is less than or equal to the running time t1, Z5 is performed.

At step Z5, the target column directly runs reversely at the preset speed and turns on the lighting system corresponding to the column system, and other column systems run at the preset speed or at a corrected speed; after the cycle is reached, each column system stops running.

The above r1 is any real number and the above t1 and t2 are time values.

In the descriptions of the present invention, it is to be understood that an orientation or position relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counter-clockwise", "axial", "radial" and "circumferential" is an orientation or position relationship indicated based on the accompanying drawings, the term is used only for ease of descriptions of the present invention and simplification of the descriptions and does not indicate or imply that the indicated devices or elements must have a particular orientation, or be constructed and operated in a particular orientation. Therefore, such terms shall not be understood as limiting of the present invention.

In addition, the terms "first" and "second" are used only for descriptions and shall not be understood as indicating or implying relative importance or implicitly indicating the number of the indicated technical features. As a result, the features defined by "first" and "second" may explicitly or implicitly comprise one or more features. In the descriptions of the present invention, "several" refers to at least two, unless otherwise clearly stated.

In the present invention, unless otherwise clearly stated or defined, the terms "mount", "connect", "couple" and "fix", and the like shall be understood in a broad sense, for example, may be fixed connection, or detachable connection, or formed into one piece; or may be mechanical connection, or electrical connection; or may be direct connection or indirect connection through an intermediate medium, or may be internal communication between two elements or mutual interaction of two elements. Those of ordinary skill in the art may understand the specific meanings of the above terms in the present invention according to actual situations.

In the present invention, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "on", "above" or "over" the second feature refers to that the first feature is exactly above or obliquely above the second feature, or only refers to that the first feature has a higher horizontal height than the second feature. The first feature being "under", "below" or "underneath" the second feature refers to that the first feature is exactly below or obliquely below the second feature, or only refers to that the first feature has a smaller horizontal height than the second feature.

In the descriptions of the specification, descriptions with reference to the terms such as "an embodiment", "some embodiments", "example", "specific examples" and "some examples" mean specific characteristics, structures, materials, or features described in combination with the embodiment or example are included in at least one embodiment or example of the present invention. In the specification, exemplary expressions of the above terms do not necessarily refer to the same embodiment or example. Furthermore, the described specific characteristics, structures, materials, or features may be combined in any one or more embodiments or examples in an appropriate manner. In addition, those skilled in the art may incorporate and combine different embodiments or examples and the features of different embodiments or examples described in the specification in a case of no conflicts.

Although the embodiments of the present invention are illustrated and described above, it is to be understood that the above embodiments are exemplary and are not intended to limit the present invention. Those of ordinary skill in the art may make changes, modifications, substitutions and variations to the above embodiments within the scope of the present invention.

After reading the above descriptions, various changes and modifications will be undoubtedly apparent to those skilled in the art. Therefore, the appended claims shall cover all changes and modifications of the true intention and scope of the present invention. Any and all equivalent scopes and contents within the scope of the claims shall be considered to fall within the intention and scope of the present invention.

The invention claimed is:

1. A kinetic sculpture, comprising a plurality of movable bases arranged radially along a circumferential direction around a centerline disposed vertically;

a bearing unit is mounted on each of the movable bases, a vertical column is mounted on the bearing unit, and a blade unit is disposed on the column, wherein the bearing units move the columns along moving paths on the respective movable bases toward the position of the centerline or away from the position of the centerline to achieve combination or separation;

wherein the blade unit of the column comprises a plurality of blade groups disposed in a spacing along an axial direction of the column; the blade group comprises a plurality of movable blades, and a blade drive unit for driving the movable blades in a same blade group to freely switch between a gathered state and a separated state, is disposed on the column.

2. The kinetic sculpture of claim 1, wherein the movable base comprises a track and a base drive assembly; a translation assembly is slidably mated on the track, and a rotary assembly is mounted on the translation assembly; the bearing unit is mounted on the rotary assembly; the translation assembly can be driven by a drive device to move back and forth on the track.

3. The kinetic sculpture of claim 2, wherein the translation assembly comprises a slide seat slidably mated on the track; a first roller assembly is disposed on the slide seat, and a first roller of the first roller assembly is rollably mated on a side wall of the track; when the slide seat slides along the track, the first roller rolls on the side wall of the track.

4. The kinetic sculpture of claim 3, wherein the rotary assembly comprises a turntable, a fixing shaft and a first driver; the fixing shaft is fixed on the slide seat, the turntable is axially limited and may be circumferentially rotatably mounted on the fixing shaft, and the first driver drives the turntable to rotate; the bearing unit is fixed on the turntable.

5. The kinetic sculpture of claim 4, wherein the first driver is a motor; an output end of the motor is provided with a gear; a peripheral wall of the turntable is provided with a gear ring, and the gear and the gear ring are mutually engaged.

6. The kinetic sculpture of claim 4, wherein a locking mechanism is disposed between the bearing unit and the slide seat; the locking mechanism comprises a lock body and a locking buckle; the locking buckle is mounted on the bearing unit and the locking body is mounted on the slide seat; the locking body is further provided with a locking tongue and a second driver, and the second driver drives the locking tongue to be inserted into the locking buckle for locking or exited from the locking buckle for unlocking.

7. The kinetic sculpture of claim 3, wherein the base drive assembly comprises a rack and a third driver; an output end of the third driver is connected with a gear; the rack is mounted on the slide seat, and the gear and the rack are mutually engaged.

8. The kinetic sculpture of claim 1, wherein the blade drive unit comprises an axial movement mechanism for driving the movable blades to move along the axial direction of the column and a circumferential movement mechanism for driving the movable blades to rotate along a circumferential direction of the column.

9. The kinetic sculpture of claim 8, wherein the axial movement mechanism comprises a traction chain pulling along the axial direction of the column, and the movable blade is connected on the corresponding traction chain.

10. The kinetic sculpture of claim 9, wherein the movable blade comprises a blade body and a support ring; the blade body is rotatably cooperated with the support ring under the drive of the circumferential movement mechanism, and the support ring is connected with the traction chain.

11. The kinetic sculpture of claim 10, wherein the support ring is an annular structure; a mounting through-hole is disposed on the movable blade; an annular slide groove is disposed in the mounting through-hole; the support ring is slidably cooperated with the slide groove along a circumferential direction of the mounting through-hole, and the movable blade and the support ring are sleeved around the column.

12. The kinetic sculpture of claim 10, wherein the circumferential movement mechanism is a blade motor, and the blade motor is fixed on the blade body of the movable blade, and the movable blade is rotated relative to the support ring under a drive force of the blade motor.

13. The kinetic sculpture of claim 12, wherein the blade motor is disposed inside the blade body of the movable blade.

14. The kinetic sculpture of claim 10, wherein the axis of the column is a curve zigzagging along a vertical direction.

15. The kinetic sculpture of claim 14, wherein a blade mounting region is vertically disposed on the column; the blade unit is located in the blade mounting region; the traction chain is vertically penetrated through the blade mounting region; a portion of the traction chain located in the blade mounting region comprises at least one functional section formed by connecting a roller unit with a length-adjustable telescoping unit, and a guide rail cooperating with the roller unit is axially laid on the column.

16. The kinetic sculpture of claim 15, wherein there are an even number of traction chains, and an annular traction chain is formed by connecting two ends of any two adjacent traction chains located outside the blade mounting region.

17. The kinetic sculpture of claim 15, wherein six annular traction chains are disposed on the column and the six annular traction chains are uniformly distributed along the circumferential direction of the column so as to form 12 functional sections in the blade mounting region, and a fixed pulley is disposed at a position that is at the top of the column and corresponds to each traction chain.

18. The kinetic sculpture of claim 15, wherein any telescoping unit and an adjacent roller unit are rotatably connected by a universal joint.

19. The kinetic sculpture of claim 15, wherein there are a plurality of roller units and a plurality of telescoping units on each functional section of each traction chain, and all roller units and all telescoping units on each functional section are arranged in sequence and connected with each other.

20. The kinetic sculpture of claim 10, wherein three connection points are disposed in a circumferential direction of the support ring of the movable blade; traction chains are disposed at positions that are on the column and correspond to the three connection points respectively, and the three connection points on the support ring and their respective corresponding traction chains are connected using one reference connection piece and two length-adjustable connection pieces respectively; the three traction chains are synchronously linked to enable the movable blade to ascend and descend along the axial direction of the column.

21. The kinetic sculpture of claim 20, wherein the reference connection piece comprises a reference connection screw rod; one end of the reference connection screw rod is fixedly connected with the corresponding traction chain, and the other end of the reference connection screw rod is connected with the support ring by a universal joint.

22. The kinetic sculpture of claim 21, wherein the reference connection piece comprises two first leveling springs symmetrically disposed at both sides of the reference connection screw rod, and both ends of the first leveling spring are connected with the support ring and the traction chain where the reference connection screw rod is located respectively.

23. The kinetic sculpture of claim 21, wherein the adjustable connection piece comprises an adjustable pull rod with an adjustable length; a lower end of the adjustable pull rod is rotatably connected with the support ring by a universal joint, and an upper end of the adjustable pull rod is located above the movable blade and rotatably connected with the corresponding traction chain by another universal joint.

24. The kinetic sculpture of claim 8, wherein the blade group comprises a reference blade connected with the column, and all movable blades in a same blade group are driven by the axial movement mechanism to move toward the reference blade to be in a gathered state or restore to be in a separated state in a direction away from the reference blade.

25. The kinetic sculpture of claim 24, wherein the reference blade comprises a blade body and a support ring; the support ring of the reference blade is fixedly connected with the column, and the blade body of the reference blade rotatably cooperates with the support ring of the reference blade.

26. The kinetic sculpture of claim 25, wherein a blade motor is disposed in the blade body of the reference blade to drive the blade body of the reference blade to rotate relative to the support ring of the reference blade.

27. The kinetic sculpture of claim 24, wherein there are four movable blades in the blade group, and the four movable blades are symmetrically disposed about a horizontal plane of the reference blade.

28. The kinetic sculpture of claim 8, wherein a reference plane perpendicular to an axis of the column is disposed in the blade group, and all movable blades in the blade group are driven by the axial movement mechanism to move toward the reference plane in the blade group to be in a gathered state or restore to be in a separated state in a direction away from the reference plane.

29. The kinetic sculpture of claim 28, wherein there are four movable blades in the blade group, and the four movable blades are symmetrically disposed about a horizontal plane of the reference plane.

30. The kinetic sculpture of claim 9, wherein the bearing unit comprises a bearing seat; the column is vertically disposed on the bearing seat; the traction chain is an annular structure; an upper portion of the traction chain is wound on a fixed pulley at the top of the column, and a lower portion of the traction chain extends onto the bearing unit and connects with a traction chain drive device on the bearing unit.

31. The kinetic sculpture of claim 30, wherein the traction chain drive device comprises a drive box located under the column; at least two drive assemblies are disposed in the drive box along the axial direction of the column; each of the drive assemblies comprises a drive shaft and a driven member in transmission connection with the drive shaft; the driven member is in transmission connection with the traction chain.

32. The kinetic sculpture of claim 31, wherein a projection position of each drive shaft along the axial direction of the column and a projection position of the adjacent drive shaft along the axial direction of the column are staggered.

33. The kinetic sculpture of claim 31, wherein a projection position of the driven member along the axial direction of the column is set along the circumferential direction of the column.

34. The kinetic sculpture of claim 31, wherein the driven members in the drive assembly are uniformly disposed along the circumferential direction of the column.

35. An intelligent control system for a kinetic sculpture, comprising the structure of the kinetic sculpture of claim 1, wherein it comprises the following steps:

Z1, each column is correspondingly provided with one column system; the column system of each column runs back and forth at a preset speed for one cycle and turns on a corresponding lighting system; in the running cycle, a difference between a real time running speed of the column system and the predetermined speed is detected and a minimum value of the differences is selected and set to r1, and the column system is set as a target column; when the absolute value of r1 is greater than a preset value, Z2 is performed;

Z2, a real time position of the target column is obtained; when the real time position of the target column is greater than a preset position, Z3 is performed; when the real time position of the target column is less than or equal to the preset position, Z4 is performed;

Z3, the preset speeds of the column systems other than the target column are corrected based on the real time running speed of the target column to maintain consistency and Z1 is performed;

Z4, the target column stops and records a running time t1 before stop, and turns off the lighting system corresponding to the column system, and also records, in real time, a real-time remaining time t2 in the cycle except for the target column system; when the remaining time t2 is less than or equal to the running time t1, Z5 is performed;

Z5, the target column directly runs reversely at the preset speed and turns on the lighting system corresponding to the column system, and other column systems run at the preset speed or at a corrected speed; after the cycle is reached, each column system stops running.

* * * * *